(12) United States Patent
Weng

(10) Patent No.: US 6,518,550 B1
(45) Date of Patent: Feb. 11, 2003

(54) SYSTEM, CONTROLLER, COMPUTER READABLE MEMORY, AND METHOD FOR PRECISE ON-LINE CONTROL OF HEAT TRANSFER IN A FOOD PREPARATION PROCESS

(75) Inventor: Zhijun Weng, Fresno, CA (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/632,150

(22) Filed: Aug. 3, 2000

Related U.S. Application Data

(63) Continuation of application No. 09/259,919, filed on Mar. 1, 1999, now Pat. No. 6,153,860.

(51) Int. Cl.$^7$ .................................................. H05B 1/02
(52) U.S. Cl. ....................... 219/497; 219/506; 219/413; 99/325; 426/420; 426/565
(58) Field of Search ................................. 219/492, 497, 219/506, 413, 508; 99/325–337; 426/520–523, 465

(56) References Cited

U.S. PATENT DOCUMENTS

| | | |
|---|---|---|
| 3,326,692 A | 6/1967 | Martino et al. |
| 4,345,145 A | 8/1982 | Norwood |
| 4,437,159 A | 3/1984 | Wangh |
| 4,608,260 A | 8/1986 | Andre |
| 4,668,856 A | 5/1987 | Axelson |
| 4,767,629 A | 8/1988 | Iglesias et al. |
| 4,801,466 A | 1/1989 | Clyne et al. |
| 4,849,235 A | 7/1989 | Braymand |
| 4,962,299 A | 10/1990 | Duborper et al. |
| 5,062,066 A | 10/1991 | Scher et al. |
| 5,094,864 A | 3/1992 | Pinon et al. |
| 5,111,028 A | 5/1992 | Lee |
| 5,277,104 A | 1/1994 | Colaner |
| 5,378,482 A | 1/1995 | Kersten et al. |
| 5,410,129 A | 4/1995 | Kersten et al. |
| 5,466,417 A | 11/1995 | Seki |
| 5,526,736 A | 6/1996 | Buriani et al. |
| 5,529,931 A | 6/1996 | Narayan |
| 5,596,514 A | 1/1997 | Maher, Jr. et al. |
| 5,619,911 A | 4/1997 | Voegtlin |
| 5,652,006 A | 7/1997 | Assinder et al. |
| 5,681,496 A | 10/1997 | Brownlow et al. |
| 5,826,496 A | 10/1998 | Jara |

(List continued on next page.)

FOREIGN PATENT DOCUMENTS

| | | |
|---|---|---|
| EP | 0302306 | 2/1989 |
| EP | 0497546 | 8/1992 |

OTHER PUBLICATIONS

Ball, C. O., "Foundation of Food Process Calculation Methods", Sterilization in Food Technology, 124–125.

(List continued on next page.)

*Primary Examiner*—Mark Paschall
(74) *Attorney, Agent, or Firm*—Dorsey & Whitney LLP; Robert B. Chickering

(57) ABSTRACT

A food preparation system, a controller, a computer readable memory, and a method for providing precise on-line control of a heat transfer process on a food item is disclosed. The food preparation system comprises a heating and/or cooling chamber, a sensor, and a controller. The chamber is configured to transfer heat to or from the food item during a phase of the heat transfer process. The sensor is configured to sense an actual temperature in the heating and/or cooling chamber at each real time epoch of the phase. The controller is configured to control the heating and/or cooling chamber according to a scheduled time-temperature profile over the phase. It is also configured to, at each real time epoch of the phase, simulate an internal temperature in the food item based on the sensed actual temperature at that real time epoch. It is further configured to terminate the phase when the simulated internal temperature at a particular real time epoch reaches a target internal temperature.

16 Claims, 10 Drawing Sheets

U.S. PATENT DOCUMENTS

| | | | |
|---|---|---|---|
| 5,827,556 A | 10/1998 | Meher, Jr. | |
| 5,888,566 A | 3/1999 | Alcaraz | |
| 5,893,051 A | 4/1999 | Tomohiro | |
| 5,981,916 A | * 11/1999 | Griffiths et al. | 219/492 |
| 6,153,860 A | 11/2000 | Weng | |

OTHER PUBLICATIONS

Ball, C. O., et al., "Heating Curve–Simple Logarithmic Temperature Rise", in *Sterilization in food technology, Theory, Practice and Calculations*, Chap. 12:313–329.

Bichier et al., "Thermal Processing of canned foods under mechanical agitation," 29th National Heat Transfer Conference, Atlanta, GA, Aug. 8–11, 1993, American Society of Mechanical Engineers Heat Transfer Division, abstract (1993).

Chang, S. Y., et al., "Heat Transfer and Simulated Sterilization of Particulate Solids in a Continuously Flowing System", *J. Food Sci.*, vol. 54(4):1017–1023 & 1030 (1989).

Clausing, A. M., "Numerical Methods in Heat Transfer", lectures on advanced heat transfer, 157–181 (1989).

Datta, A. K., et al., "Computer–based Retort Control Logic for On–Line Correction of Process Deviations", *J. Food Sci.*, 51(2):480–483 & 507 (1986).

Denys, S., et al., "Evaluation of Process Deviations, Consisting of Drops in Rotational Speed, during Thermal Processing of Foods in Rotary Water Cascading Retorts", *J. Food Engg.*, 30:327–338 (1996).

Downing, D.L., "Canning of Marine Products", *A Complete Course in Canning and Related Processes*, Book III, p. 249, CTI Publications, Inc., Baltimore, MD (1996).

Erdoğdu, F., et al., "Modeling of Heat Conduction in Elliptical Cross Section: I. Development and Testing on the Model", *Journal of Food Engineering*, vol. 38, pp. 223–239, (1998).

Fastag, J., et al., "Variable Control of a Batch Retort and Process Simulation of Optimization Studies", *J. of Food Process Engg.*, 19:1–14 (Nov. 1996).

FMC FoodTech, "NumeriCAL On–Line™ for Batch Retorts . . . " (1997).

FMC FoodTech, "FMC's NumeriCAL™ v.2.09" (1995).

FMC FoodTech, "FMC's NumeriCAL™ Model 101 Software" (1995).

FMC Food Tech, "BatchCAL™ Thermal Processing Software" (1995).

Giannoni–Succar, E. B., et al., "Correction Factor of Deviant Thermal Processes Applied to Packaged Heat Conduction Food", repr. from *J. Food Sci.*, 47(2):642–646 (1982).

Gill et al., "Computerized Control Strategies for a Steam Retort," Journal of Food Engineering, 10:135–154 (1989).

Hayakawa, K., "Estimating Heat Processes in Canned Foods", *Ashrae Journal*, 17(9):36–37 (Sep. 1975); Author corrects errors, *Food Technol.*, 29(2):70 (1975).

Hayakawa, K., "Experimental Formulas for Accurate Estimation of Transient Temperature of Food and Their Application to Thermal Process Evaluation", repr. from *Food Technology*, 24(12):89–99 (1970).

Lanoiselle, J.–L., et al., "Predicting Internal Temperature of Canned Foods During Thermal Processing using a Linear Recursive Model", *J. Food Sci.*, 60(4):833–840 (1995).

Larkin, J. W., et al., "Experimental Errors Associated with the Estimation of Thermal Diffusivity from Thermal Process Data", *J. Food Sci.*, 52(2):419–428 (1987).

Manson, J. E., "Evaluating Complex Deviations–Hydrostatic Sterilizers", *TechniCAL, Inc.*, Chap. 12: 12.1–12.4.

Manson, J. E., "Evaluation of Lethality and Nutrient Retentions of Conduction–Heating Foods in Rectangular Containers", *Food Technology*, 24(11):109–113 (1970).

McConnell, J.E.W., "Effect of a Drop in Retort Temperature Upon the Lethality of Processes for Convection Heating Products", *Food Tech.*, 76–78 (Feb. 1952).

Navankasattusas, S., et al., "Monitoring and Controlling Thermal Processes by On–Line Measurement of Accomplished Lethality", *Food Technology*, 79–83 (Mar. 1978).

Press, W. H., et al., "Parabolic Interpolation and Brent's Method in One Dimension", Chap. 10.2, Minimization or Maximization of Functions, 395–398.

Simpson, R., et al., "Computer Control of Batch Retort Process Operations", Food Processing Automation Conference (Proceedings), FPEI, ASAE, Lexington, KY (May 6–8, 1991).

Teixeira, A. A., et al., "Computer Optimization of Nutrient Retention in the Thermal Processing of Conduction–Heated Foods", *Food Technology*, vol. 23(845):137–142 (Jun. 1969).

Teixeira, A. A., et al., "Computer Control of Batch Retort Operations with On–Line Correction of Process Deviations", *Food Technology*, 85–90 (Apr. 1982).

Teixeira et al., "On–Line retort control in Thermal Sterilization of canned foods," Food Control, 8(1): 13–20 (1997).

Teixeira, A. A., "Innovative Heat Transfer Models: From Research Lab to On–Line Implementation", *Food Processing Automation II*, proceedings of the 1992 FPEI Conference, 177–184 (May 4–6, 1992).

Weng, Z., et al., "Process Deviation Analysis of Conduction–Heating Canned Foods Processed in a Hydrostatic Sterilizer Using a Mathematical Model", *Journal Food Processing Automation IV*, vol. 41(6):368–379 (1995).

Weng et al. "Computer Control of a Hydrostatic Sterilizer Operations with On–Line Correction of Process Deviations," Presentation Slides, IFT '96, New Orleans, Jun. 23, 1996.

Weng, Z., et al., "The Use of a Time–Temperature–Integrator in Conjunction with Mathematical Modelling for Determining Liquid/Particle Heat Transfer Coefficients", *J. Food Engg.*, 16:197–214 (1992).

Weng, Z., U.S. application No. 09/187,333, "Controller and Method for Administering and Providing On–Line Correction of a Batch Sterilization Process".

Weng, Z., U.S. application No. 09/188,531, "Controller and Method for Administering and Providing On–Line Handling of Deviations in a Rotary Sterilization Process".

Weng, Z., U.S. application No. 09/187,915, "Controller Method for Administering and Providing On–Line Handling of Deviations in a Hydrostatic Sterilization".

Weng et al, "Computer Control of a Hydrostatic Sterilizer Operations with On–Line Correction of Process Deviations," IFT '96, New Orleans, abstract, Jun. 23, 1996.

Young, K. E., et al., "Predicting Product Lethality in Hydrostatic Retorts", vol. 50:1467–1472 (1985).

Young, K. E., et al., "Product Temperature Prediction in Hydrostatic Retorts", *Transactions of the ASAE*, vol. 26(1):316–320 (1983).

Zhao, Y., et al., "Computer Simulation on Onboard Chilling and Freezing of Albacore Tuna", *Journal of Food Science*, vol. 63, No. 5, pp. 751–755, (1998).

Weng, Z., U.S. application No. 09/560,637, "Controller and Method for Administering and Providing On–Line Handling of Deviations in a Continuous Oven Cooking Process".

Fahloul et al., "Measurements and Predictive Modelling of Heat Fluxes in Continuous Baking Ovens," Journal of Food Engineering, 26:469–479 (1995).

Huang et al., "Meatball Cooking–Modeling and Simulation," Journal of Food Engineering, 24:87–100 (1995).

Wang et al., "A Mathematical Model of Simultaneous Heat and Moisture Transfer during Drying of Potato," Journal of Food Engineering, 24:47–60 (1995).

Chen et al., "Modeling coupled heat and mass transfer for convection cooking of chicken patties," Journal of Food Engineering, 42:139–146 (1999).

Chang et al., "Modeling Heat Transfer During Oven Roasting of Unstuffed Turkeys," Journal of Food Science, 63(2):257–261 (1998).

* cited by examiner

SYSTEM, CONTROLLER, COMPUTER READABLE MEMORY, AND METHOD FOR PRECISE ON-LINE CONTROL OF HEAT TRANSFER IN A FOOD PREPARATION PROCESS

This is a continuation of application Ser. No. 09/259,919, filed on Mar. 1, 1999 now U.S. Pat. No. 6,153,860.

TECHNICAL FIELD OF THE INVENTION

The present invention relates generally to food preparation processes. In particular, it pertains to a technique for providing precise on-line (i.e., automatic) control of heat transfer in a food preparation process.

BACKGROUND OF THE INVENTION

There are numerous types of food preparation processes for preparing food items for further processing or consumption. Many of these require heat transfer to or from a food item. Typically, this heat transfer is manually controlled or pneumatically controlled with a simple PLC (programmed logic controller) system. As a result, the quality and yield of the food item that is being prepared is adversely affected.

For example, a precooking process is used to precook tuna fish for canning the loins (i.e., the desired meat) of the tuna fish. In this precooking process, tuna fish is precooked in live steam. This is done until a target backbone loin temperature is reached at the widest portion of the loins near the backbone of the tuna fish. The loins are then extracted and cleaned. This is done manually by removing the head, tail, and fins of the tuna fish, scraping off the skin and red meat from around the loins, and deboning the loins. The cleaned loins are then ready for packing into a can.

This precooking process is one of the most critical steps for canning tuna fish. It directly affects the yield and the quality of the canned tuna fish. However, as alluded to earlier, a typical precooking process is controlled either manually or pneumatically. The precooking is usually done at a high and constant temperature to enable extraction and cleaning of the loins of the tuna fish. Moreover, manual measurements of the backbone loin temperature at the widest portion of the tuna fish are made in order to determine if the target backbone loin temperature there has been reached. As a result, the surface and the thinner portions of the tuna fish are usually overcooked. This causes yield loss and makes the skinning process very tedious and difficult. In addition, overcooking often causes the skin of the tuna fish to break. This oxidizes the loins and diminishes their quality.

It is evident from the foregoing that precise control of heat transfer in a food preparation process, such as a tuna fish precooking process, is economically important for a food producer. Therefore, it is highly desirable to provide a technique for precise on-line control of the heat transfer in such a process to improve the yield and the quality of the food item being prepared.

SUMMARY OF THE INVENTION

In summary, the present invention comprises a food preparation system, a controller, a computer readable memory, and a method for providing precise on-line control of a heat transfer process on a food item. The food preparation system comprises a heating and/or cooling chamber, a sensor, and a controller. The chamber is configured to transfer heat to or from the food item during a phase of the heat transfer process. The sensor is configured to sense an actual temperature in the heating and/or cooling chamber at each real time epoch of the phase. The controller is configured to control the heating and/or cooling chamber according to a scheduled time-temperature profile over the phase. It is also configured to, at each real time epoch of the phase, simulate an internal temperature in the food item based on the sensed actual temperature at that real time epoch. It is further configured to terminate the phase when the simulated internal temperature at a particular real time epoch reaches a target internal temperature.

DETAILED DESCRIPTION OF THE INVENTION

Figure 1:
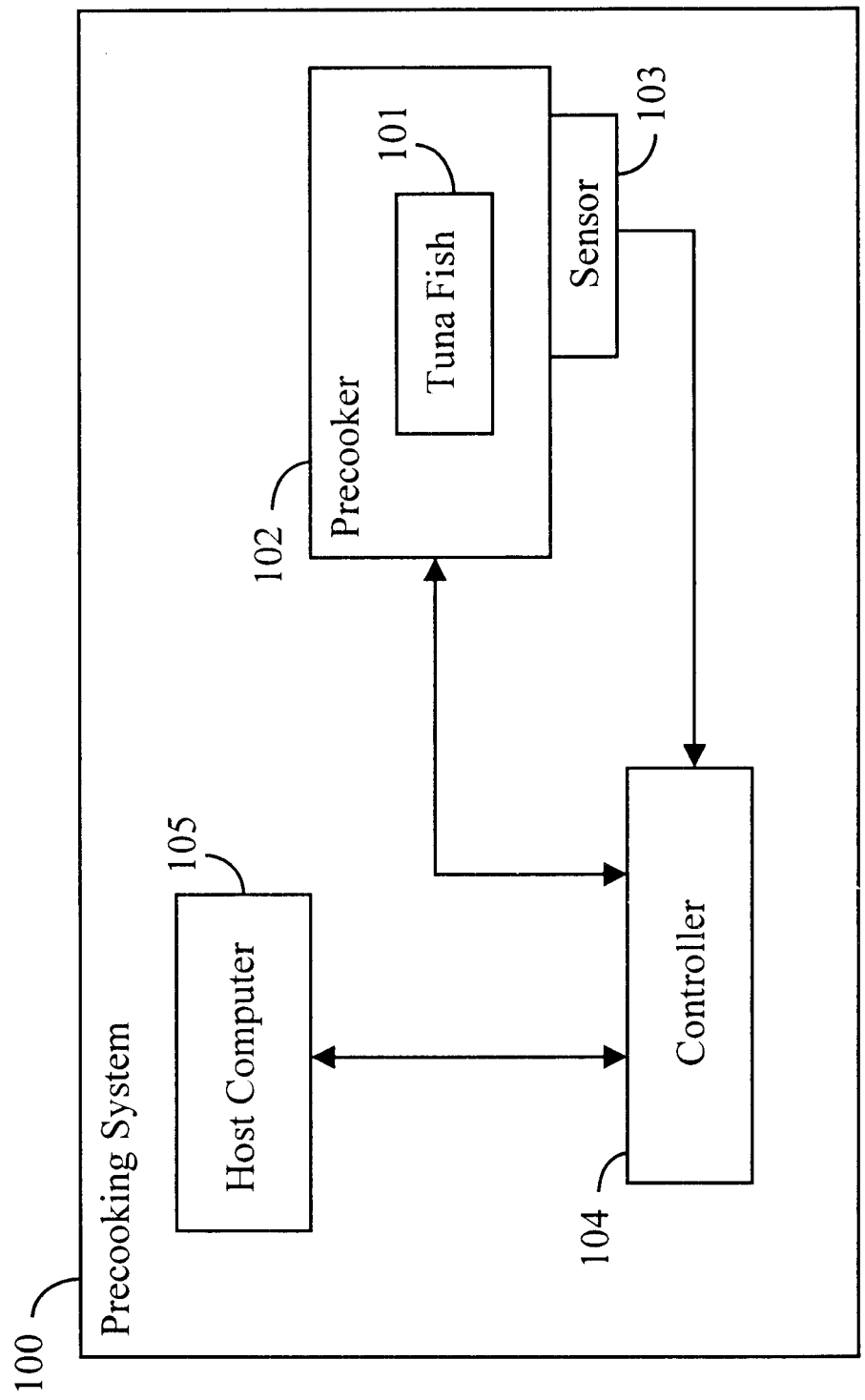
FIG. 1 shows a block diagram of a tuna fish precooking system in accordance with one embodiment of the present invention.

Referring to FIG. 1, there is shown an exemplary embodiment of the invention in the form of a precooking system 100 for performing a precooking process on tuna fish 101. However, as will be discussed in section 3.e., the invention can be applied more generally to any food preparation process in which heat transfer is used to prepare a food item for further processing or consumption.

The tuna fish precooking system comprises a precooker 102 and a temperature sensor 103 in the precooker. The precooker is used to transfer heat to or from the tuna fish 101. For example, the precooker may be a freezer or refrigerator in which heat is removed from the tuna fish in order to freeze or cool it. Or, the precooker may be a cooker, precooker, or oven in which heat is provided to the tuna fish to cook, precook, or heat the item.

The controller 104 controls the operation of the precooker 102. This is done in response to the actual temperatures inside the precooker that are sensed with the temperature sensor 103.

The host computer 105 is used to provide input information, namely input parameters and software, used by the controller 104 in controlling the food preparation process. The host computer is also used to receive, process, and display output information about the process which is generated by the controller.

1. Hardware and Software Configuration of Controller 104

Figure 2:
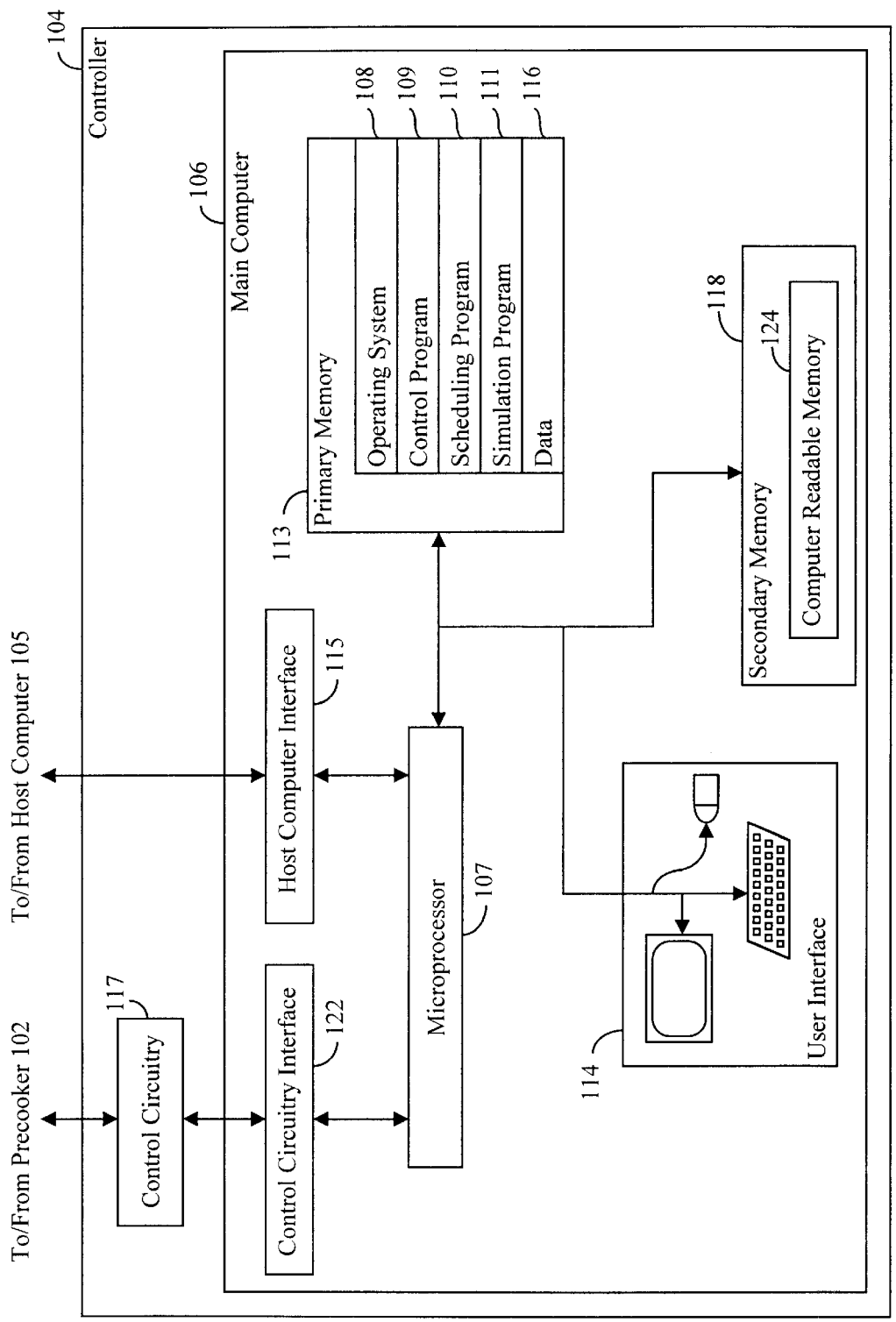
FIG. 2 shows a block diagram of a controller of the tuna fish precooking system of FIG. 1.

Referring to FIG. 2, the controller 104 comprises a main control computer 106 that includes a microprocessor (i.e., CPU) 107, a primary memory 113, and a secondary memory 118. The microprocessor executes an operating system 108, a control program 109, a scheduling program 110, and a simulation program 111 of the controller. The operating system and programs are loaded from the secondary memory into the primary memory during execution.

The operating system 108 and the programs 109 to 111 are executed by the microprocessor 107 in response to commands issued by the operator. These commands may be issued with a user interface 114 of the main control computer 106 and/or the host computer 105 via a host computer interface 115 of the controller 104. The operating system 108 controls and coordinates the execution of the programs 109 to 111. Data 116 generated by the operating system and the programs during execution and data 116 inputted by the operator is stored in the primary memory 113. This data includes input information provided by the operator with the user interface and/or the host computer via the host computer interface. It also includes output information that is to be displayed to the operator and provided to the user interface or the host computer via the host computer interface.

The controller 104 also comprises control circuitry 117. The control circuitry includes circuits, microprocessors, memories, and software to control the food preparation process by generating control signals that control the sequential operation of the precooker 102. As alluded to earlier, the software may be downloaded from the host computer 105 and provided to the control circuitry by the control program 109. The control signals are generated in response to commands generated by the control program and issued to the control circuitry from the microprocessor 107 via the control circuitry interface 122.

Furthermore, at each real time step $t_r$ of the food preparation process, the control circuitry 117 receives sensor signals from the temperature sensor 103 that represent the actual temperature $T_a(t_r)$ sensed by the sensor. The control circuitry generates the control signals for controlling the precooker 102 in response to the sensed actual temperature. The sensed actual temperature is also provided to the microprocessor 107 via the control circuitry interface 122 and recorded by the control program 109 as data 116 in the primary memory 113. The sensed actual temperature is used by the control program in the manner described later for on-line control of the food preparation process.

The sensor 103 is preferably located in the slowest heating zone of the precooker 102 to provide a conservative estimate of the actual temperature $T_a(t_r)$. However, if this is not possible, the control program 109 may adjust the temperature provided by the sensor to estimate the actual temperature at the slowest heating zone. This adjustment would be done according to temperature distribution data 116 in the primary memory 113 generated from heat distribution tests conducted on the precooker.

As mentioned earlier, the operating system 108 and the programs 109 and 110 are normally stored in the secondary memory 118 and then loaded into the primary memory 113 during execution. The secondary memory comprises a computer readable memory 124 that is readable by the main control computer 106 of the controller 104. This computer readable memory is therefore used to direct the controller in on-line control of the food preparation process. The computer readable memory may comprise a PROM (programmable read only memory) that stores the operating system and/or programs. Alternatively or additionally, the computer readable memory may comprise a magnetic or CD ROM storage disc that stores the operating system and/or programs. The computer readable memory in this case is readable by the main control computer with a magnetic or CD ROM storage disk drive of the secondary memory. Moreover, the operating system and/or programs could also be downloaded to the computer readable memory or the primary memory from the host computer 105 via the host computer interface 115.

2.a. Overall Process Flow

Figure 3:
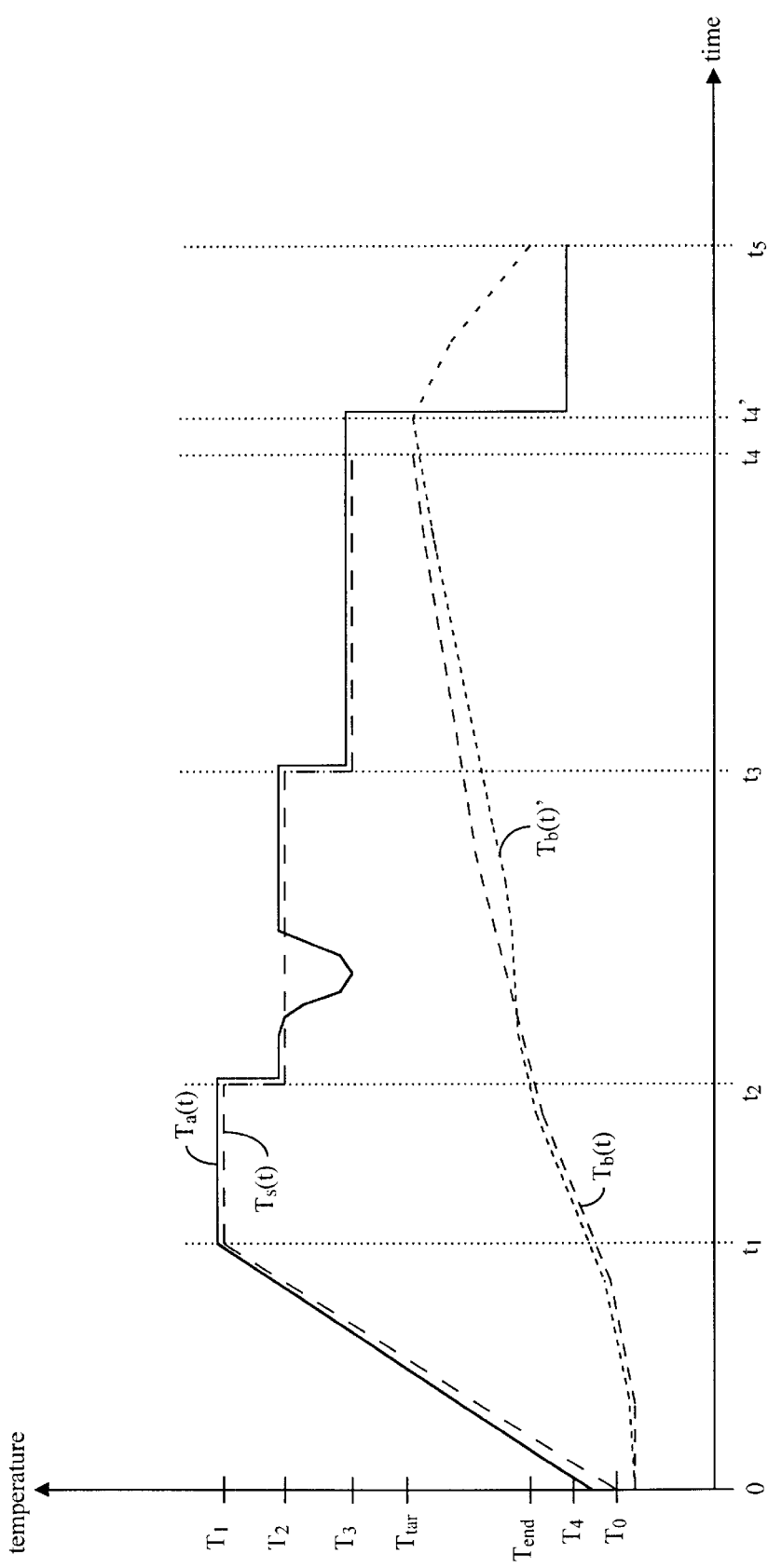
FIG. 3 shows an overall process flow diagram for one embodiment of the controller of FIG. 2 in controlling a tuna fish precooking process.

The controller 104 of FIGS. 1 and 2 controls the precooking process generally according to the overall process flow of FIG. 3. In the first step 126, the input parameters for the precooking process are defined and provided to the controller.

The input parameters include a predefined time period $\Delta t$ for each real time step (or increment) $[t_r-\Delta t, t_r]$ from the previous real time epoch $t_r-\Delta t$ to the current real time epoch $t_r$ during the process. This time period may range from 0.1 to 1 seconds.

The input parameters also include the initial temperature $T_i$, and size, namely the height H, width W, and length L, of the tuna fish being processed. These input parameters are manually measured by the operator before the tuna fish is placed in the precooker 102 of FIG. 1.

The target backbone loin temperature $T_{targ}$, the thermal conductivity k, the specific heat capacity $C_p$, the density $\rho$, and the surface convective heat transfer coefficient h for the tuna fish type (or species) of the tuna fish 101 of FIG. 1 are also included as input parameters. These input parameters are predetermined using well known techniques.

The precooking process has a heating phase and a cooling phase. The heating phase includes a come-up subphase and a processing subphase and is performed in the precooker 102 of FIG. 1. The input parameters therefore also include a scheduled initial precooking temperature $T_0$ and scheduled processing temperatures $T_1$ to $T_3$. The come-up phase is used to bring the scheduled initial precooking temperature $T_0$ in the precooker 102 of FIG. 1 up to the scheduled maximum processing temperature $T_1$. The processing subphase is used to precook the tuna fish 101 of FIG. 1 at the scheduled processing temperatures $T_1$ to $T_3$ for extraction and cleaning of the loins of the tuna fish.

The cooling phase is used to cool the tuna fish after the heating phase so that the extraction and cleaning of the loins can take place. In this embodiment, the cooling phase is not performed in the precooker 102 of the tuna fish precooking system 100 of FIG. 1. This is often the case in many tuna fish processing plants for capacity reasons. However, in a different embodiment, the precooker may also be used to partially or completely perform the cooling phase, as will be discussed in more detail in section 3.a.

The input parameters also include scheduled begin times $t_1$ and $t_2$. The scheduled begin time $t_1$ is for the processing subphase when the scheduled maximum processing temperature $T_1$ is reached. The scheduled begin time $t_2$ is for a time-temperature step during the heating phase in which the precooking process is stabilized at the scheduled maximum processing temperature $T_1$. Also included in the input parameters is an estimated end time tend for the heating phase. All of these input parameters are dependent on several factors, such as the precooker type, the tuna fish type (or species), size, and source, and the tuna fish processing plant capacity. Moreover, they may be determined experimentally. For example, the scheduled begin time $t_1$ may be determined by using heat distribution tests for the precooker 102 of FIG. 1. Similarly, the estimated end time tend may be determined from the collected results of previous precooking processes performed in the precooker.

In order to perform step 126 of FIG. 3, the operator issues commands with the user interface 114 and/or the host computer 105 to invoke the control program 109. Then, the operator enters the input parameters $\Delta t$, $T_i$, H, W, L, $T_{targ}$, $T_{end}$, k, $C_p$, $\rho$, $T_0$ to $T_{3,\ t1}$, and $t_{end}$ with the user interface and/or the host computer. The control program loads the entered input parameters into the primary memory 113 for use by the programs 109 to 111. The execution of these programs is controlled and coordinated by the control program in the manner discussed next.

Figure 4:
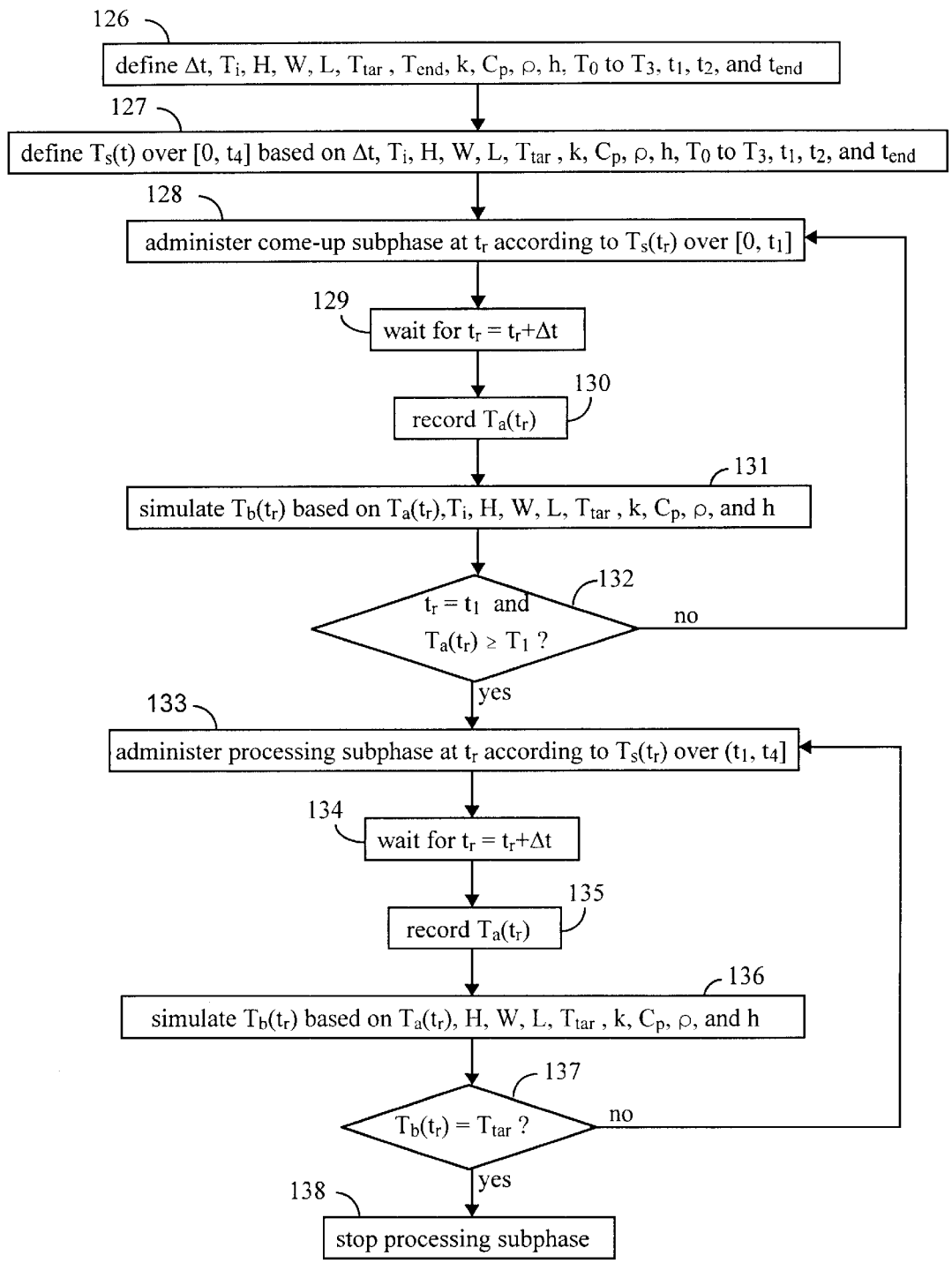
FIG. 4 shows a timing diagram for the overall process flow of FIG. 3.

Referring now to both FIGS. 3 and 4, the control program 109 of FIG. 2 first invokes the scheduling program 110 of FIG. 2. In step 127, the process scheduling program defines a scheduled heating time-temperature profile $T_s(t)$ over a scheduled heating time interval [0, $t_4$] for the heating phase of the precooking process, where 0 is the scheduled begin time for the heating phase. For purposes of this document, an open bracket [or] indicates that the corresponding time is included in the time interval while a closed bracket (or) indicates that the corresponding time is not included in the time interval. The profile is defined based on the input parameters $\Delta t$, $T_i$, H, W, L, $T_{targ}$, k, $C_p$, $\rho$, $T_0$ to $T_{3,\ t1}$, and $t_{end}$. The precise manner in which step 127 is performed will be discussed in detail in section 2.b.

The scheduled heating time-temperature profile $T_s(t)$ covers the come-up and processing subphases of the heating phase. The profile has a come-up portion over a scheduled come-up time interval [0, $t_1$) for the come-up subphase, where 0 and $t_1$ are respectively the scheduled begin times for the come-up and processing subphases. Over this time interval, the come-up portion ramps up in temperature between the scheduled initial temperature $T_0$ and the scheduled maximum precooking temperature $T_1$.

The scheduled heating time-temperature profile $T_s(t)$ also has a processing portion over a scheduled processing time interval [$t_1$, $t_4$] for the processing subphase, where $t_4$ is the scheduled end time for the processing subphase. In the exemplary embodiment, the processing portion includes three decreasing time-temperature steps (or segments) to ramp the precooking process down from the scheduled processing temperature $T_1$ to the scheduled processing temperature $T_3$. The time-temperature steps occur over respective scheduled time intervals [$t_1$, $t_2$), [$t_2$, $t_3$), and [$t_3$, $t_4$] and at the respective scheduled constant processing temperatures $T_1$, $T_2$, and $T_3$. Here, $t_1$, $t_2$, and $t_3$ are respectively the scheduled begin times for the first, second, and third steps and $t_4$ is the scheduled end time for the third step.

The control program 109 of FIG. 2 then causes the come-up subphase in step 128 to be administered by the control circuitry 117 of FIG. 2 at each real time epoch $t_r$ of the come-up subphase. The control circuitry does so in accordance with the come-up portion of the scheduled heating time-temperature profile $T_s(t)$ by appropriately controlling the precooker 102 of FIG. 1. This means that an actual time-temperature profile $T_a(t)$ for the precooking process is attempted to be brought up along the come-up portion over the scheduled come-up time interval [0, $t_1$). More specifically, the control circuitry controls the precooker and monitors the sensed actual temperature $T_a(t_r)$ at each real time epoch $t_r$ of the come-up subphase to make sure that this temperature stays at least equal to the corresponding scheduled come-up temperature $T_s(t_r)$ for that time epoch. The temperature $T_s(t_r)$ is obtained from the profile $T_s(t)$.

Then, the control program 109 of FIG. 2 waits for the next real time epoch $t_r=+\Delta t_r$ in step 129. In step 130, the control program records the actual temperature $T_a(t_r)$ sensed at this epoch in the precooker of FIG. 1. By doing this at each real time epoch $t_r$ of the come-up subphase, the control program compiles a come-up portion of the actual time-temperature profile $T_a(t)$ over the come-up time interval [0, $t_1$).

The control program 109 of FIG. 2 then invokes the simulation program 111 of FIG. 2 for step 131. In step 131, the simulation program simulates at each real time epoch $t_r$ of the come-up subphase a backbone loin temperature $T_b(t_r)$ at that epoch for the widest portion of the tuna fish 101 of FIG. 1. This is done based on the actual temperature $T_a(t_r)$ sensed at this epoch and recorded in step 131 since the actual temperature $T_a(t_r)$ may be different from the scheduled temperature $T_s(t_r)$. Furthermore, this also done based on the input parameters $T_i$, W, H, L, k, $C_p$, $\rho$, and h. The precise manner in which step 131 is performed is discussed in greater detail in section 2.c.

In step 132, the control program 109 of FIG. 2 determines whether the come-up subphase of the heating phase has been completed and the processing subphase is to begin. This is done by determining if the current real time epoch $t_r$ is the scheduled end time $t_1$ for the come-up subphase and if the actual temperature $T_a(t_r)$ has reached the scheduled processing temperature $T_1$. If both of these conditions are not satisfied, then the control program returns to step 128 and steps 128 to 132 are repeated until this is determined in step 132. If both of these conditions are finally satisfied, the control program proceeds to step 133.

After the come-up phase has been completed, the control program 109 of FIG. 2 causes the processing subphase to be administered in step 133 by the control circuitry 117 of FIG. 2 at each real time epoch $t_r$ of the processing subphase. Similar to in the come-up phase, the control circuitry does so in accordance with the processing portion of the scheduled heating time-temperature profile $T_s(t)$ by appropriately controlling the precooker 102 of FIG. 1. In this case, the actual time-temperature profile $T_a(t)$ for the precooking process is attempted to be maintained along the time-temperature steps of the processing portion over the scheduled processing time interval [$t_1$, $t_4$]. More specifically, the control circuitry controls the precooker and monitors the sensed actual temperature $T_a(t_r)$ at each real time epoch $t_r$ of the processing subphase to make sure that this temperature stays at least equal to the corresponding scheduled processing temperature $T_s(t)=T_1$, $T_2$, or $T_3$ for that time epoch. The temperature $T_s(t_r)$ is obtained from the profile $T_s(t)$.

Steps 134 and 135 are similar to steps 129 and 130. Thus, the control program 109 of FIG. 2 then waits for the next real time epoch $t_r=+\Delta t_r$ in step 134. In step 135, the control program records the actual temperature $T_a(t)$ at this epoch sensed in the precooker of FIG. 1. Since this is done at each real time epoch $t_r$ of the processing subphase, the control program compiles a processing portion of the actual time-temperature profile $T_a t$) over the processing time interval ($t_1$, $t_4$].

The control program 109 of FIG. 2 then again invokes the simulation program 111 of FIG. 2 for step 136. Step 136 is similar to step 131. Thus, in step 136, the simulation program simulates at each real time epoch $t_r$ of the processing subphase the backbone loin temperature $T_b(t_r$ at that epoch. This is done in the same manner as step 131, except that the actual temperature $T_a(t_r)$ sensed at this epoch and recorded in step 135 is used. As with step 131, the precise manner in which step 136 is performed is discussed in greater detail in section 2.c.

In step 137, the control program 109 of FIG. 2 determines whether the processing subphase of the heating phase has been completed. This is done by determining whether the simulated backbone loin temperature $T_b(t_r)$ at the current real time epoch $t_r$ has reached the target backbone loin temperature $T_{targ}$. If it has not, then the control program returns to step 133 and steps 133 to 137 are repeated until it is finally determined in step 137 that the processing subphase has been completed. The epoch at which this occurs is then the actual end time $t_4'$ of the processing subphase. This is of course is also the actual end time of the heating phase. The processing subphase then stopped in step 138. This of course means that the heating phase is completed.

It is important to note here that the actual end time $t_4'$ may occur before or after the scheduled end time $t_4$. This is due to the fact that the simulation performed insteps 131 and 136 takes full thermal credit for the actual time-temperature profile $T_a(t)$. Thus, if the profile $T_a(t)$ is lower than the scheduled time-temperature profile $T_s(t)$ for a significant time interval, as shown in the example of FIG. 4, then the actual time $t_4'$ will occur after the scheduled time $t_4$. For this kind of temperature deviation, the control program 109 of FIG. 2 will cause the control circuitry 117 of FIG. 2 to continue to administer the processing subphase in step 133 at each real time epoch $t_r$ after the scheduled end time $t_4$ until the actual end time $t_4'$ is reached. This is done by extending the scheduled time-temperature step at the scheduled temperature $T_3$ over an extended time interval $[t_3, t_4']$. Conversely, if the profile $T_a(t)$ is higher than the scheduled time-temperature profile $T_s(t)$ for a significant time interval, then the actual end time $t_4'$ will occur before the scheduled end time $t_4$. The scheduled time-temperature step will be shortened over a shortened time interval $[t_3, t_4']$ for this kind of temperature deviation. In either case, an adjusted time-temperature step over an adjusted time interval results. The cooling phase is then performed after the heating phase. As mentioned earlier, the cooling phase is not performed in the precooker 102 of FIG. 1 in this embodiment of the tuna fish precooking system 100.

The tuna fish precooking process just described provides a significant increase in quality, yield, and energy savings compared to other types of tuna fish precooking processes. There are a number of reasons for this increase and they are described next.

The use of a scheduled heating time-temperature profile $T_s(t)$ with a come-up portion that quickly ramps up to a maximum processing temperature $T_1$ followed by a short time-temperature step at this temperature serves several important purposes. First, this is very effective in beginning the heat wave for the heat transfer to the tuna fish 101 of FIG. 1. Second, this stabilizes the remainder of the precooking process. Specifically, any insulating air around the surfaces of the tuna fish 101 of FIG. 1 is quickly vented (or expelled) from the precooker 102 of FIG. 1. This ensures that all of the surfaces of the tuna fish will receive the same uniform actual temperature $T_a(t_r)$ at each epoch $t_r$ throughout the rest of the precooking process. As a result, the quality of the extracted loins of the tuna fish will be high.

The use of the decreasing time-temperature steps in the scheduled time-temperature profile $T_s(t)$ also serve several important purposes. First, the heat transfer in the tuna fish 101 of FIG. 1 is slow and limited by the thermal conductivity of the loins. Thus, the decreasing time-temperature steps avoid overcooking of the loins in the thinner portions of the tuna fish. In fact, the last time-temperature step avoids overcooking of the loins in the thinner portions while allowing the loins in the thicker portions to still be cooked. The decreasing time-temperature steps also avoid breaking the skin of the tuna fish so that the loins will not be oxidized. This increases the quality and yield of the extracted loins. Second, there is a tremendous energy saving by maintaining the actual time-temperature profile $T_a(t_r)$ along the decreasing time-temperature steps rather than keeping it constant throughout the heating phase at the maximum processing temperature $T_1$.

Furthermore, the ability to precisely predict when the target backbone loin temperature $T_{targ}$ has been reached is also very important. This prevents overcooking from occurring and increases the quality and yield of the extracted loins. Furthermore, energy is saved since the end of the heating phase is precisely determined.

2.b. Detailed Process Flow for Step 127 of FIG. 3

Figure 5A:
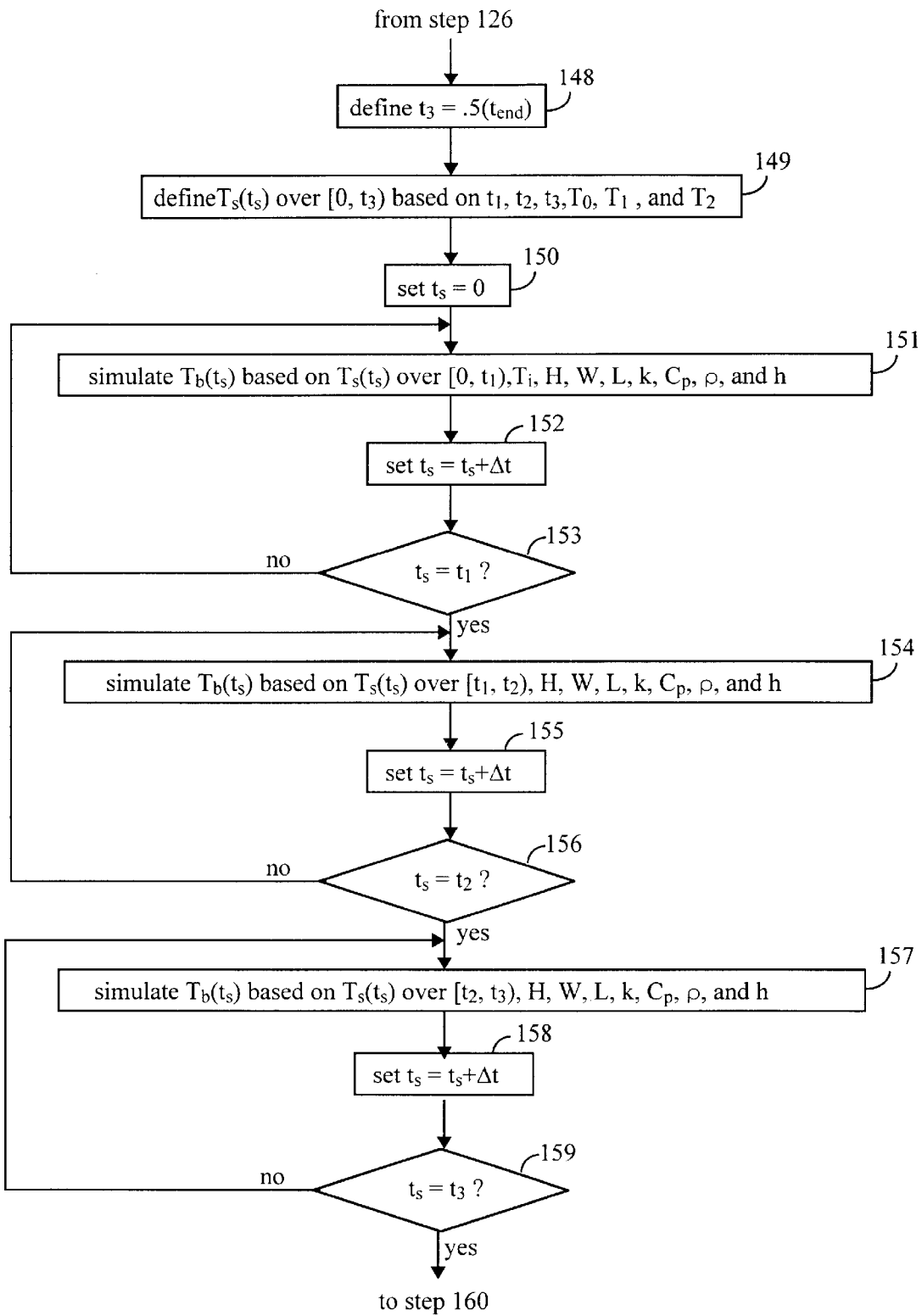
FIG. 5 is a detailed process flow diagram of a step in the overall process flow of FIG. 3 for defining a scheduled time-temperature profile.
Figure 5B:
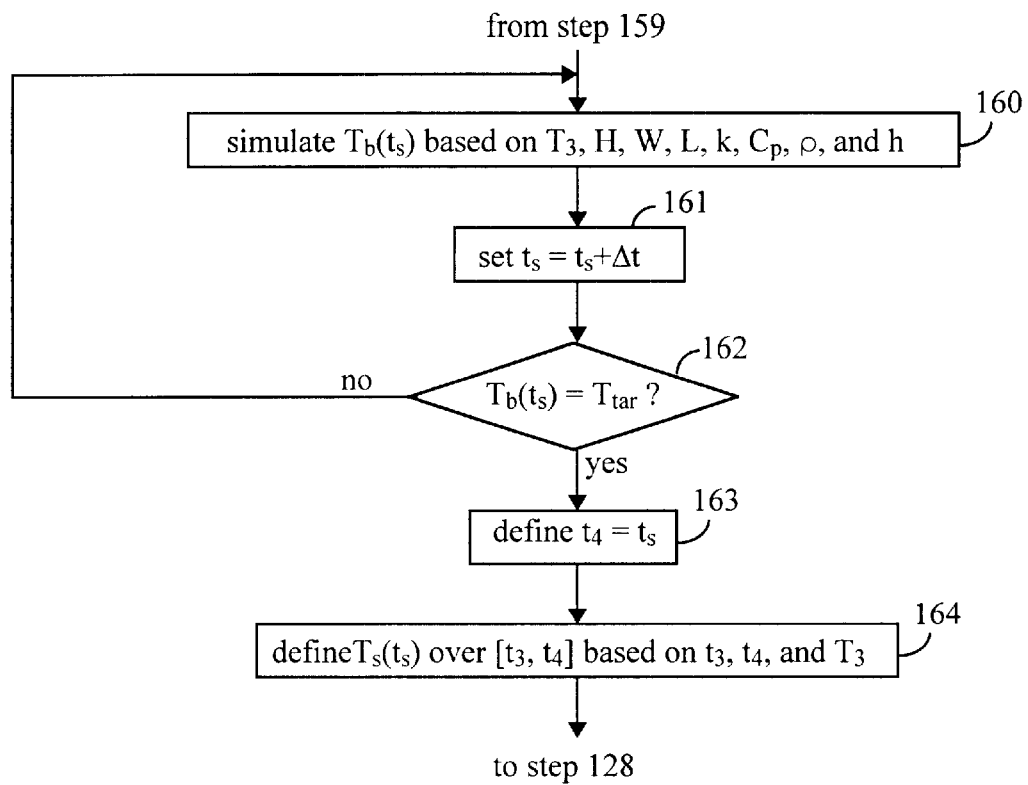

FIG. 5 shows a detailed process flow for step 127 of FIG. 3. As indicated earlier in section 2.a., the scheduling program 110 of FIG. 2 uses this step to define the scheduled heating time-temperature profile $T_s(t)$.

Referring to both FIGS. 3 and 5, in sub-step 148 of step 127, the scheduling program 110 of FIG. 2 defines the scheduled begin time $t_3$ of the time-temperature step at the scheduled processing temperature $T_2$. In this embodiment, this begin time is defined as one half of the estimated end time tend of the entire heating phase.

Then, in sub-step 149 of step 127, the scheduling program 110 of FIG. 2 defines the scheduled heating time-temperature profile $T_s(t)$ over the time interval $[0, t_3)$. In doing so, the come-up portion of the profile over the time interval $[0, t_1)$ is defined based on the scheduled begin time $t_1$ of the come-up subphase and the scheduled initial precooking and processing temperatures $T_0$ and $T_1$. Similarly, the first two time-temperature steps over the time intervals $[t_1, t_2)$ and $[t_2, t_3)$ in the processing portion of the profile are also defined. The first time-temperature step is defined based on the begin times $t_1$ and $t_2$ of the first two time-temperature steps and the scheduled processing temperature $T_1$. The second time-temperature step is defined based on the begin times $t_2$ and $t_3$ of the last two time-temperature steps and the scheduled processing temperature $T_2$.

The scheduling program 110 of FIG. 2 then iteratively performs a simulation of the come-up subphase in sub-steps 150 to 153 of step 127. In step 150, the current simulation time epoch $t_s$ is initially set to the begin time 0 of the come-up subphase. Steps 151 to 153 are then performed in each iteration of the come-up phase simulation.

The scheduling program 110 of FIG. 2 invokes the simulation program 111 of FIG. 2 for step 151 of each iteration. In step 151 of each iteration, the backbone loin temperature $T_b(t_s)$ at the current simulation time epoch $t_s$ is simulated. This simulation is performed in the same manner as steps 131 and 136 of FIG. 3, except that the scheduled temperature $T_s(t_s)$ at this epoch is used. This scheduled temperature is obtained from the come-up portion of the scheduled heating time-temperature profile $T_s(t)$ over the time interval $[0, t_1)$, which is defined in step 149. As with steps 131 and 136, the precise manner in which step 151 is performed is discussed in greater detail in section 2.c.

In step 152 of each iteration, the previous simulation time epoch $t_s$ is incremented by the amount of the time period $\Delta t$. This results in a new current simulation time epoch $t_s$.

Then, in step 153 of each iteration, it is determined whether the come-up simulation has been completed. This is done by determining whether the current simulation time epoch $t_s$ is the scheduled begin time $t_1$ for the processing subphase. If it is not, then steps 151 to 153 are repeated until this is determined in step 153. When this finally occurs, the scheduling program 110 of FIG. 2 proceeds to step 154.

The scheduling program 110 of FIG. 2 then iteratively performs a simulation of the scheduled first time-temperature step in the processing subphase. This is done with sub-steps 154 to 156 of step 127, which are performed in each iteration of this simulation. Steps 154 to 156 are the same as steps 151 to 153, except for some differences that will be described now.

In step 154 of each iteration, the scheduled temperature $T_s(t_s)$ used to simulate the backbone loin temperature $T_b(t_s)$ is obtained from the scheduled first time-temperature step over the time interval $[t_1, t_2]$ in the scheduled heating time-temperature profile $T_s(t)$. The scheduled first time-temperature step is defined in step 149.

In step 156 of each iteration, it is determined whether the current simulation time epoch $t_s$ is the scheduled end time $t_2$ for the scheduled first time-temperature step. In other words, it is determined whether the simulation of the scheduled first time-temperature step has been completed. If it is not, then steps 154 to 156 are repeated until this is determined in step 156. When this finally occurs, the scheduling program 110 of FIG. 2 proceeds to step 157.

The scheduling program 110 of FIG. 2 then iteratively performs a simulation of the scheduled second time-temperature step in the processing subphase. This is done with sub-steps 157 to 159 of step 127. These steps are performed in each iteration of this simulation. Steps 157 to 159 are the same as steps 154 to 156, except for the differences noted next.

In step 157 of each iteration, the scheduled temperature $T_s(t_s)$ used to simulate the backbone loin temperature $T_b(t_s)$ is obtained from the scheduled second time-temperature step over the time interval $[t_2, t_3]$ in the scheduled heating time-temperature profile $T_s(t)$. The scheduled first time-temperature step is also defined in step 149.

In step 159 of each iteration, it is determined whether the simulation of the scheduled second time-temperature step has been completed. This is done by determining if the current simulation time epoch $t_s$ is the scheduled end time $t_3$ for the scheduled second time-temperature step. If it is not, then steps 157 to 159 are repeated until this is determined in step 156. When this is finally occurs, the scheduling program 110 of FIG. 2 proceeds to step 160.

The scheduling program 110 of FIG. 2 then iteratively performs a simulation of the third time-temperature step in the processing subphase. This is done with sub-steps 160 to 162 of step 127, which are performed in each iteration of this simulation. Steps 160 to 162 are also the same as steps 154 to 156, except for the differences mentioned next.

In step 161 of each iteration, the backbone loin temperature $T_b(t_s)$ is simulated based on the scheduled processing temperature $T_3$. Then, in step 162 of each iteration, it is determined whether the simulation of the third time-temperature step has been completed. This is done by determining whether the simulated backbone loin temperature $T_b(t_s)$ at the current simulation time epoch $t_s$ has reached the target backbone loin temperature $T_{targ}$. If it has not, then steps 160 to 162 are repeated until it is finally determined in step 162 that the simulation of the third time-temperature step has been completed.

In sub-step 163 of step 127, the current simulation time epoch $t_s$ at which this occurs is then defined by the simulation program of FIG. 2 as the scheduled end time $t_4$ of the third time-temperature step. This is also the scheduled end time of the processing subphase and the heating phase.

Then, in sub-step 164 of step 127, the simulation program of FIG. 2 defines the scheduled third time-temperature step over the time interval $[t_3, t_4]$. This is based on the end times $t_3$ and $t_4$ of the last two time-temperature steps and the scheduled processing temperature $T_3$.

The control program 109 of FIG. 2 will then proceed to step 128 of FIG. 3 and begin administration of the come-up subphase. This is done in the manner discussed earlier in section 2.a.

2.c. Detailed Process Flow for Steps 151, 154, and 157 of FIG. 5, Steps 131, 136, and 142 of FIGS. 3 and 8, and Step 172 of FIG. 8

Figure 6:
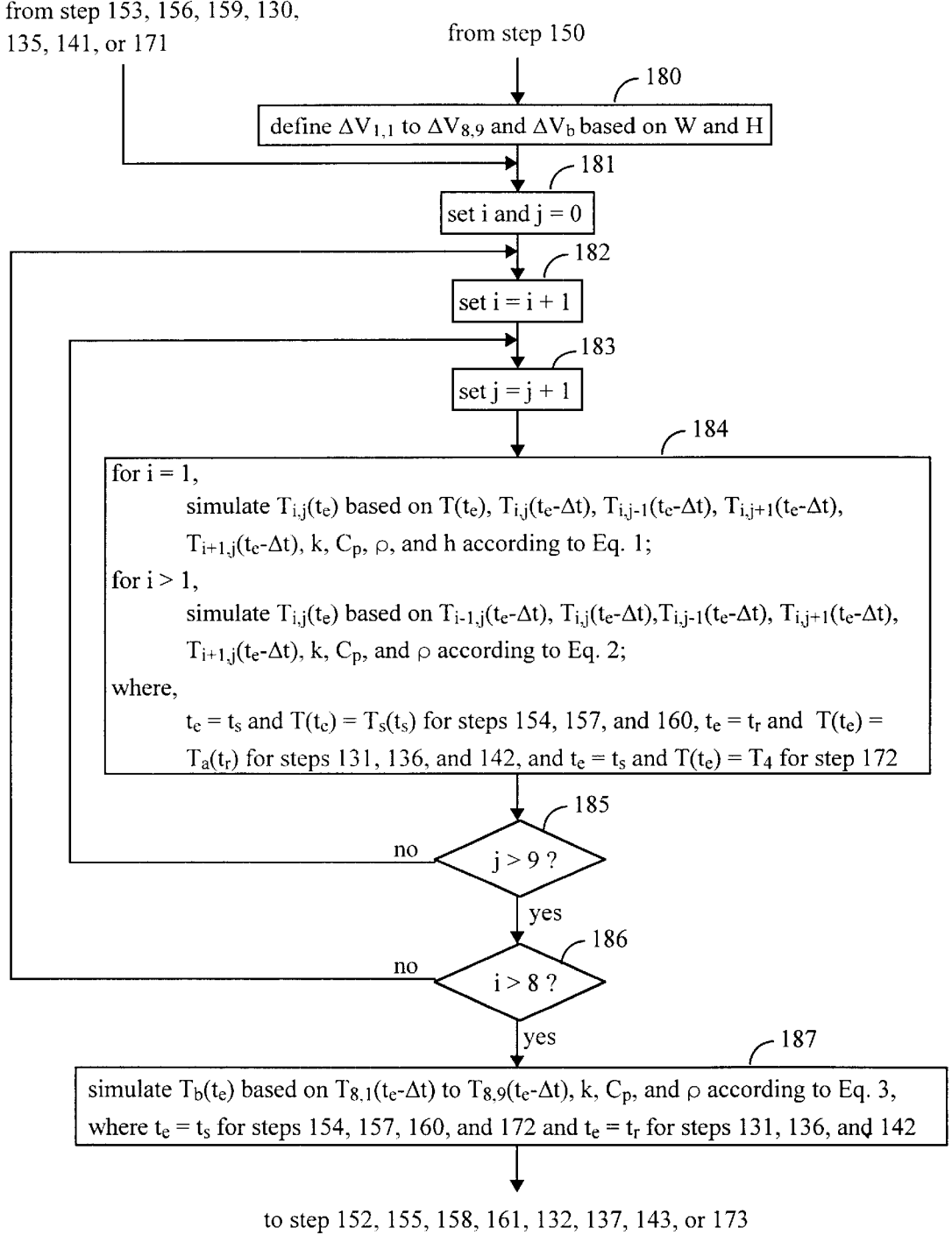
FIG. 6 shows a detailed flow diagram for a step in the overall process flow of FIGS. 3 and 7 for simulating a tuna fish backbone loin temperature.
Figure 8:
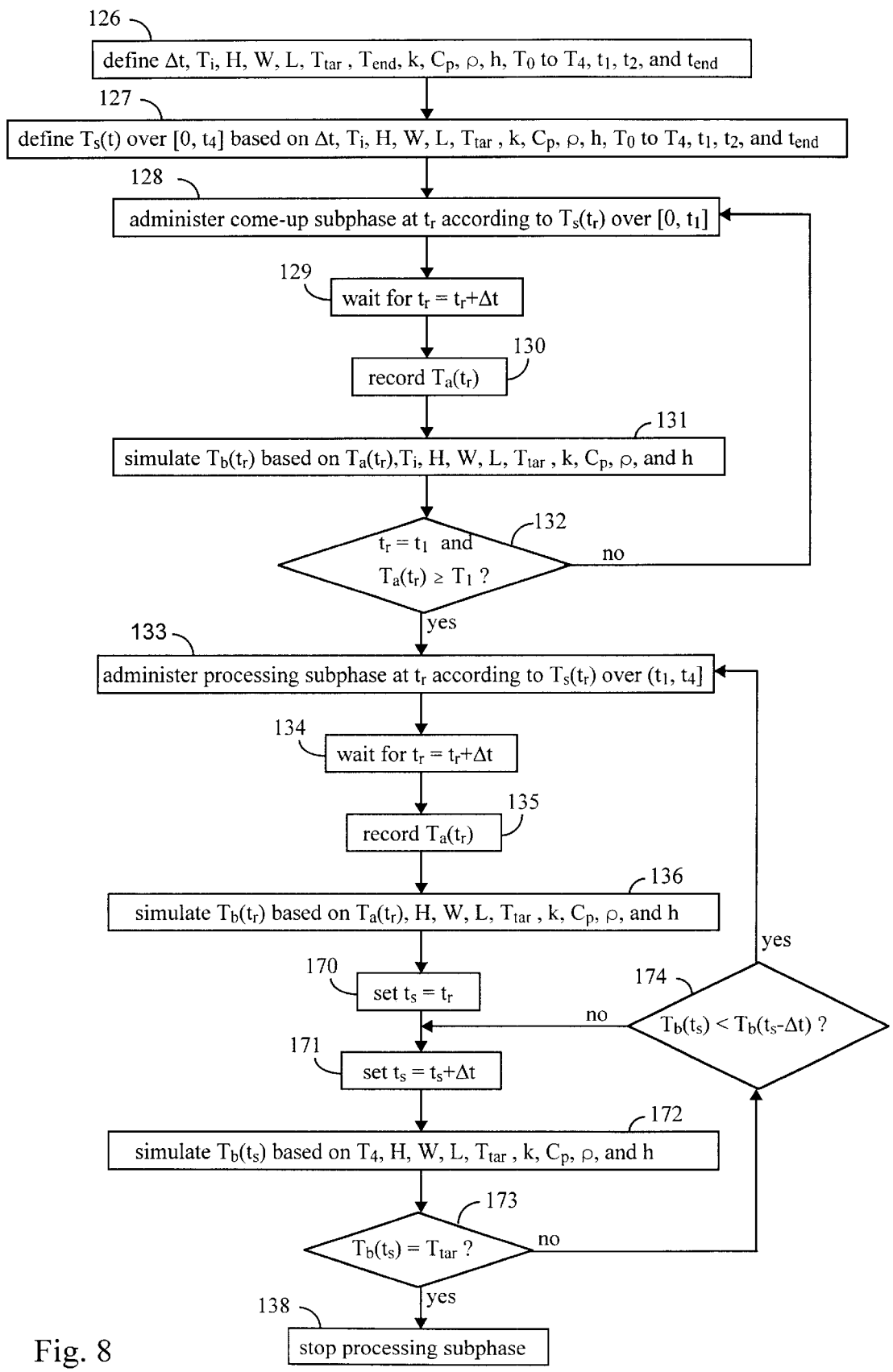
FIG. 8 shows an overall process flow diagram for another embodiment of the controller of FIG. 2 in controlling a tuna fish precooking process.

As was discussed earlier in sections 2.a. and 2.b., a backbone loin temperature $T_b(t_s)$ or $T_b(t_r)$ is simulated for the tuna fish 101 of FIG. 1 in steps 151, 154, and 157 of FIG. 5, steps 131, 136, and 142 of FIGS. 3 and 8, and step 172 of FIG. 8. This temperature is simulated for the widest portion of the tuna fish, as mentioned in section 2.a. The same detailed simulation flow diagram is used for all of these steps and is shown in FIG. 6.

Figure 7:
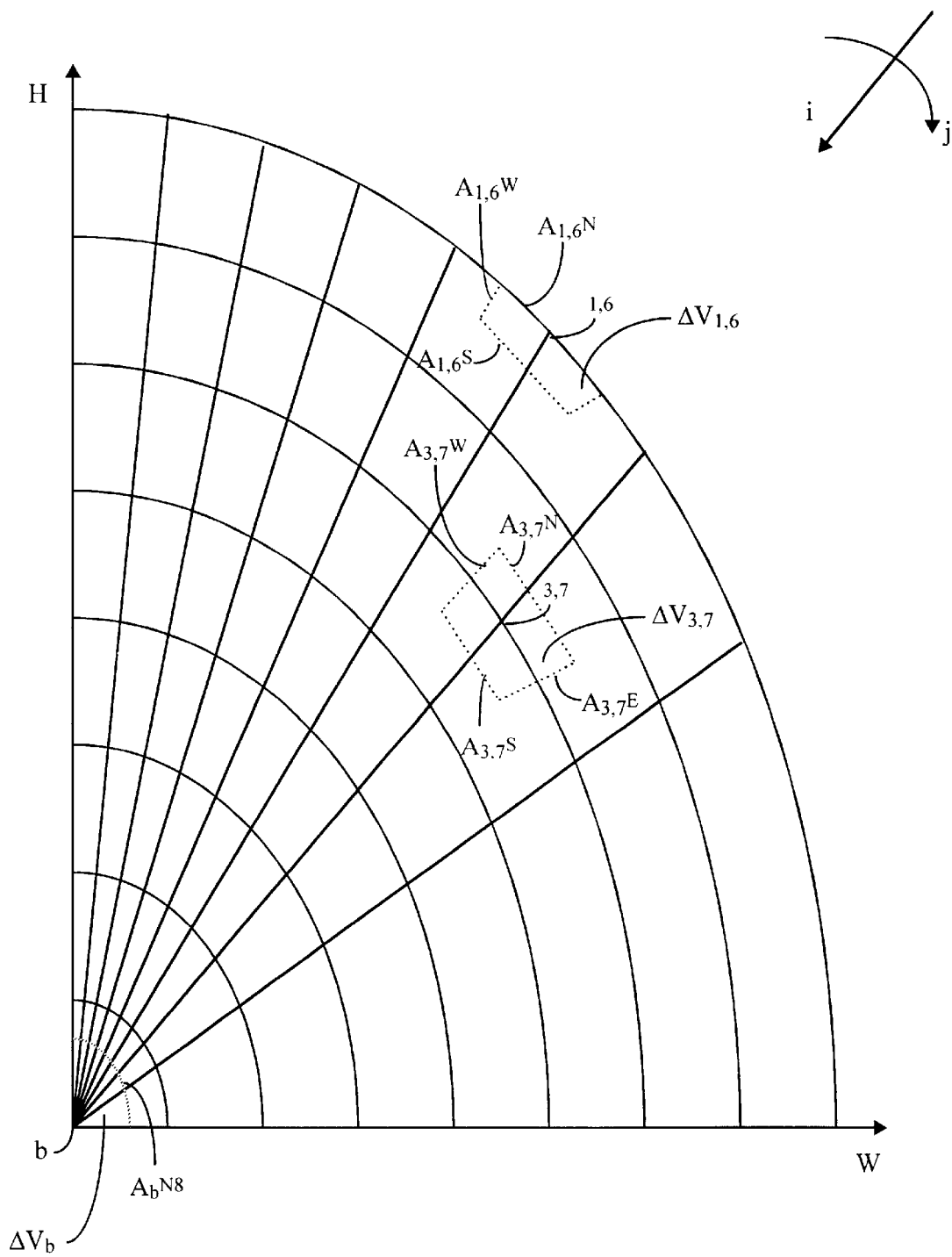
FIG. 7 shows a nodal system for volume elements used in the detailed flow diagram of FIG. 6

In order to perform this simulation for the widest portion of the tuna fish 101 of FIG. 1, the simulation program 111 of FIG. 2 includes a finite difference model utilizing volume elements $\Delta V_{1,1}$ to $\Delta V_{8,9}$ and $\Delta V_b$, as shown in FIG. 7. These volume elements are used to model the heat transfer at the widest portion of the tuna fish at a particular time epoch $t_e$, where the time epoch $t_e$ is a simulation time epoch $t_s$ for steps 151, 154, 157, and 172 and is a real time epoch $t_r$ for steps 131, 136, and 142. This is done by simulating the corresponding temperatures $T_{1,1}(t_e)$ to $T_{8,9}(t_e)$ in the corresponding volume elements $\Delta V_{1,1}$ to $\Delta V_{8,9}$ from which the temperature $T_b(t_e)$ in the volume element $\Delta V_b$ can be simulated. As discussed in sections 2.a. and 3.c., this is the backbone loin temperature $T_b(t_r)$ or $T_b(t_s)$ used in steps 137 or 173 of FIGS. 3 and 8 to determine whether the target backbone loin temperature $T_{targ}$ has been reached.

Step 151 of FIG. 5 is the first time that a simulation will be done in the precooking process. Thus, after step 150 of FIG. 5, step 151 has the sub-step 180 of FIG. 6 in which the volume elements are defined by the simulation program 111 of FIG. 2 for the entire precooking process. This is done based on the height H and width W of the tuna fish in the manner discussed next.

The volume elements $\Delta V_{1,1}$ to $\Delta V_{8,9}$ and $\Delta V_b$ lie in a quarter of the elliptical cross section of the tuna fish 101 of FIG. 1 at the widest portion and are constructed in a nodal system, with indexes i and j, in the manner shown in FIG. 7. Each node i,j is used to identify a corresponding volume element $\Delta V_{ij}$ and temperature $T_{ij}(t_e)$ in the volume element at the node. Similarly, the node b is used to identify the volume element $\Delta V_b$ near the backbone of the tuna fish and the temperature $T_b(t_e)$ in the volume element at that node. As those skilled in the art will recognize, the number with the index i ranging from 1 to I and the index j ranging from 1 to j, of volume elements (i.e., nodes) used with the index i ranging from 1 to I and the index j ranging from 1 to j, is based on the height H and width W of the tuna fish 101 of FIG. 1. In the example shown in FIG. 7, the index i ranges from 1 to 18 and the index j ranges from 1 to 59 so that 73 volume elements (including the volume element $\Delta V_b$) are used.

Each volume element $\Delta V_{ij}$ is defined to have two surface areas $A_{ij}^N$ and $A_{ij}^S$ along the j index, where N and S refer to North and South respectively, and two surface areas $A_{ij}^W$ and $A_{ij}^E$ along the i index, where W and E refer to West and East respectively. Each volume element is also defined to have a thickness of unity in the direction perpendicular to the i,j plane. Moreover, each volume element and its corresponding surface areas are determined based on the height H and width W of the tuna fish 101 of FIG. 1 and the nodal system constructed in FIG. 7.

The volume element $\Delta V_b$ is somewhat different than the other volume elements $\Delta V_{1,1}$ to $\Delta V_{8,9}$. It also has a thickness of unity in the direction perpendicular to the i,j plane. But, it includes 9 North surface areas $A_b^{N1}$ to $A_b^{N9}$ that are respectively adjacent (and equal) to the South surface areas $A_{8,1}^S$ to $A_{8,9}^S$ of the volume elements $\Delta V_{8,1}$ to $\Delta V_{8,9}$.

All of the steps 151, 154, and 157 of FIG. 5, steps 131, 136, and 142 of FIGS. 3 and 8, and step 172 of FIG. 8 have steps 181 to 187 of FIG. 6 as sub-steps. In step 181, the indexes i and j are set to 0. Steps 182 to 186 are then used by the simulation program 111 of FIG. 2 to simulate the temperatures $T_{1,1}(t_e)$ to $T_{8,9}(t_e)$ in the volume elements $\Delta V_{1,1}$ to $\Delta V_{8,9}$ in nested loop fashion.

In step 182 of each loop for the index i, the simulation program 111 of FIG. 2 increments the previous index i by one to compute the current index i. Then, in step 183 of each loop for the index j, the simulation program increments the previous index j by one to compute the current index j.

In step 184 of each loop for the index j, the temperature $T_{ij}(t_e)$ in the corresponding volume element $\Delta V_{ij}$ at the current time epoch $t_e$ is simulated. For each of the volume elements $\Delta V_{1,1}$ to $\Delta V_{1,9}$ along the surface of the tuna fish 101 of FIG. 1, this is done based on the input parameters k, $C_p$, $\rho$, and h, the temperature $T(t_e)$ at the current epoch $t_e$ in the precooker 102 of FIG. 1, the temperatures $T_{ij}(t_e-\Delta t)$, $T_{ij-1}(t_e-\Delta t)$, $T_{ij+1}(t_e-\Delta t,)$, and $T_{i+ij}(t_e-\Delta t)$ in that volume element $\Delta V_{ij}$ and the adjacent volume elements $\Delta V_{ij-1} \Delta V_{ij+1}$, and $\Delta V_{i+ij}$ at the previous time epoch $t_e-\Delta t$, and the corresponding east, west, and south surface areas $A_{ij}^W$, $A_{ij}^E$ and $A_{ij}^S$. Moreover, this is done according to:

$$\rho C p \Delta V_{i,j} \frac{T_{i,j}(t_e) - T_{i,j}(t_e - \Delta t_e)}{\Delta t_e} = \qquad (1)$$
$$k A_{i,j}^W \frac{T_{i,j-1}(t_e - \Delta t_e) - T_{i,j}(t_e - \Delta t_e)}{\Delta x_{i,j}^W} +$$
$$k A_{i,j}^E \frac{T_{i,j+1}(t_e - \Delta t_e) - T_{i,j}(t_e - \Delta t_e)}{\Delta x_{i,j}^E} +$$
$$k A_{i,j}^S \frac{T_{i+1,j}(t_e - \Delta t_e) - T_{i,j}(t_e - \Delta t_e)}{\Delta y_{i,j}^S} + h A_{i,j}^N (T(t_e) - T_{i,j}(t_e - \Delta t_e))$$

where $\Delta X_{ij}^W$, $\Delta X_{ij}^E$, and $\Delta Y_{ij}^S$ are respectively the distances between the node i,j and the adjacent nodes i,j−1, i,j+1, and i+1,j at the West, East, and South surface areas. These distances are also defined with the corresponding volume element.

FIG. 7 shows the surface volume element $\Delta V_{1,6}$. For this volume element and the other surface volume elements $\Delta V_{1,2}$ to $\Delta V_{1,5}$ and $\Delta V_{1,7}$ to $\Delta V_{1,8}$ all of the terms in Eq. 1 are used. However, it should be noted that, for surface volume element $\Delta V_{1,1}$, the term with the temperature $T_{ij-1}(t_e)$ drops out because there is no adjacent volume element $\Delta V_{ij-1}$. Similarly, the term with the temperature $T_{ij+1}(t_e)$ drops out for the surface volume element $\Delta V_{1,9}$.

For each of the volume elements $\Delta V_{2,1}$ to $\Delta V_{8,9}$ in the interior of the tuna fish 101 of FIG. 1, step 184 is performed in a similar manner to that just described for the surface volume elements $\Delta V_{1,1}$ to $\Delta V_{1,9}$. However, for each volume element $\Delta V_{ij}$ in this case, the input parameter h is not used but the temperature $T_{i-1j}(t_e-\Delta t)$ in the adjacent volume element $\Delta V_{i-1j}$ at the previous time epoch $t_e-\Delta t$ and the corresponding North surface area $A_{ij}^N$ are used. This is due the fact that this volume element is in the interior of the tuna fish and will have a volume element $\Delta V_{i-1j}$ below it. In this case, the simulation is done according to:

$$\rho C p \Delta V_{i,j} \frac{T_{i,j}(t_e) - T_{i,j}(t_e - \Delta t_e)}{\Delta t_e} = \qquad (2)$$
$$k A_{i,j}^W \frac{T_{i,j-1}(t_e - \Delta t_e) - T_{i,j}(t_e - \Delta t_e)}{\Delta x_{i,j}^W} +$$
$$k A_{i,j}^E \frac{T_{i,j+1}(t_e - \Delta t_e) - T_{i,j}(t_e - \Delta t_e)}{\Delta x_{i,j}^E} +$$
$$k A_{i,j}^S \frac{T_{i+1,j}(t_e - \Delta t_e) - T_{i,j}(t_e - \Delta t_e)}{\Delta y_{i,j}^S} +$$
$$k A_{i,j}^N \frac{T_{i-1,j}(t_e - \Delta t_e) - T_{i,j}(t_e - \Delta t_e)}{\Delta y_{i,j}^N}$$

where $\Delta Y_{ij}^N$ is the distance between the node i,j and the adjacent node i−1, j at the North surface area.

FIG. 7 also shows the interior volume element $\Delta V_{3,7}$. For this volume element and the other interior elements $\Delta V_{2,2}$ to $\Delta V_{2,8}$, $\Delta V_{3,2}$ to $\Delta V_{3,6}$, $\Delta V_{3,8}$, $\Delta V_{4,2}$ to $\Delta V_{4,8}$, ..., and $\Delta V_{8,2}$ to $\Delta V_{8,8}$, all of the terms in Eq. 1 are used. However, for the interior volume elements $\Delta V_{2,1}$, $\Delta V_{3,1}$, ..., and $\Delta V_{8,1}$ the term with the temperature $T_{ij-1}(t_e)$ drops out because there is no adjacent volume element $\Delta V_{ij-1}$. Similarly, the term with the temperature $T_{ij+1}(t_e)$ drops out for the surface volume elements $\Delta V_{2,9}$, $\Delta V_{3,9}$, ..., and $\Delta V_{8,9}$.

In step 184, the time epoch $t_e$ is the current simulation time epoch $t_s$ and the temperature $T(t_e)$ is the scheduled come-up or processing temperature $T_s(t_s)$ at this epoch in the case where step 184 is a sub-step of step 154, 157, or 160. Similarly, in the case where step 184 is a sub-step of step 172, the time epoch $t_e$ is the current simulation time epoch $t_s$ and the temperature $T(t_e)$ is the scheduled cooling temperature $T_4$. And, the time epoch $t_s$ is the current real time epoch $t_r$ and the temperature $T(t_e)$ is the actual temperature $T_a(t_r)$ at this epoch in the case where step 184 is a sub-step of step 131, 136, or 142.

In step 185 of each loop for the index i, the simulation program 111 of FIG. 2 determines if the index has reached 9. If it has not, then steps 183 to 185 are repeated until this is finally determined. In this way, all of the temperatures $T_{i,1}(t_e)$ to $T_{i,9}(t_e)$ in the corresponding volume elements $\Delta V_{i,1}$ to $\Delta V_{i,9}$ with same index i are simulated in the same loop with the current index i.

Then, in step 186 of each loop for the index j, the simulation program 111 of FIG. 2 determines if this index has reached 8. If it has not, then steps 182 to 186 are repeated until this is finally determined. This results in all of the temperatures $T_{1,1}(t_e)$ to $T_{8,9}(t_e)$ in all of the volume elements $\Delta V_{1,1}$ to $\Delta V_{8,9}$ being simulated.

Then, in step 187, the temperature $T_b(t_e)$ in the final volume element $\Delta V_b$ is simulated by the simulation program 111 of FIG. 2. This is done based on the input parameters k, $C_p$, and $\rho$, the temperatures $T_b(t_e-\Delta t)$ and $T_{8,1}(t_e-\Delta t)$ to $T_{8,9}(t_e-\Delta t)$ in that volume element $\Delta V_b$ and the adjacent volume elements $\Delta V_{8,1}$ to $\Delta V_{8,9}$ at the previous time epoch $t_e-\Delta t$, and the corresponding North surface areas $A_b^{N1}$ to $A_b^{N9}$. Here, the simulation is done according to:

$$\rho Cp \Delta V_b \frac{T_b(t_e) - T_b(t_e - \Delta t_e)}{\Delta t_e} = \sum_{j=1}^{9} k A_b^{Nj} \frac{T_b - T_b(t_e - \Delta t_e)}{\Delta y_b^{Nj}} \quad (3)$$

where $\Delta Y_b^{N1}$ to $\Delta Y_b^{N9}$ are respectively the distances between the node b and the adjacent nodes 8,1 to 8,9 at the North surface area. Here as well, the time epoch $t_e$ is the current simulation time epoch $t_s$ in the case where step 184 is a sub-step of step 154, 157, 160 or 172 and is the current real time epoch $t_r$ in the case where step 184 is a sub-step of step 131, 136, or 142.

The control program 109 of FIG. 2 will then proceed to step 152, 155, 158, or 161 of FIG. 3, step 132, 137, or 143 of FIG. 3 or 8, or step 173 of FIG. 8. This is done in the manner discussed in sections 2.a., 2.b., or 3.a.

3. Alternative Embodiments

As indicated earlier, FIGS. 1 to 6 and sections 1. and 2. disclose an exemplary embodiment of the invention. However, alternative embodiments that utilize the principles and concepts developed for the exemplary embodiment do exist.

3.a. More Aggressive Embodiment

The exemplary embodiment of the invention is conservative. This is due to the fact that the overall process flow diagram of FIG. 3 provides a conservative approach for determining when the target backbone loin temperature $T_{targ}$ has been reached. Specifically, the backbone loin temperature $T_b(t_r)$ at each real time epoch $t_r$ is simulated in steps 131 and 136 and compared against the target backbone loin temperature in step 137. However, as mentioned earlier, the heat transfer in the tuna fish 101 of FIG. 1 is slow. Therefore, the backbone loin temperature will continue to increase over a portion of the cooling phase and the maximum backbone loin temperature reached during the precooking process will exceed the target backbone loin temperature. This may result in the tuna fish being overcooked.

FIG. 8 shows another overall process flow diagram for a more aggressive embodiment of the invention. Here, steps 126 to 136 and 138 are the same as those in the overall process flow diagram of FIG. 3, except that a scheduled cooling temperature $T_4$ is defined in step 126 as one of the input parameters.

In step 170, the control program 109 of FIG. 2 sets a current simulation time epoch $t_s$ to the current real time epoch $t_r$. This is done so that steps 171 to 174 can be used to iteratively simulate the cooling phase with the assumption that the processing subphase has ended at the current real time epoch.

In step 171 of each iteration, the control program 109 of FIG. 2 increments the previous simulation time epoch $t_s$ by the amount of the time period $\Delta t$. This results in a new current simulation time epoch $t_s$.

The control program 109 of FIG. 2 invokes the simulation program 111 of FIG. 2 for step 172 of each iteration. In step 172 of each iteration, the simulation program simulates at the current simulation time epoch $t_s$ of the cooling phase the backbone loin temperature $T_b(t_s)$ at that epoch. This is done in the same manner as in steps 131 and 136 of FIG. 3, except that it is based on the scheduled cooling temperature $T_4$. As with steps 131 and 136, the precise manner in which step 172 is performed is discussed in greater detail in section 2.c.

Then, in step 173 of each iteration, the process control program 109 of FIG. 2 determines whether the simulated backbone loin temperature $T_b(t_s)$ at the current simulation time epoch $t_s$ has reached the target backbone loin temperature $T_{targ}$. If this condition is satisfied, then this means that the processing subphase can end at the current real time epoch $t_r$ since the target backbone loin temperature $T_{targ}$ will be reached during the cooling phase. In this case, the control program ends the processing subphase in step 138. However, if the condition is not satisfied, then the process control program proceeds to step 174.

In step 174 of each iteration, the process control program 109 of FIG. 2 determines if the simulated backbone loin temperature $T_b(t_s)$ at the current simulation time epoch $t_s$ is lower than the simulated backbone loin temperature $T_b(t_s-\Delta t)$ at the previous simulation time epoch $t_s-\Delta t$. If the condition of step 174 is satisfied, then this means that the target backbone loin temperature $T_{targ}$ will not be reached during the cooling phase if the processing subphase were to end at the current real time epoch $t_r$. As a result, the control program 109 returns to step 133. Steps 133 to 136 and 170 to 174 are then repeated until it is finally determined in step 173 that the target backbone loin temperature $T_{targ}$ will be reached during the cooling phase if the processing subphase is ended at the current real time epoch. If the condition of step 174 is not satisfied, then it is possible that the target backbone loin temperature $T_{targ}$ will be reached during the cooling phase. In this case, steps 171 to 174 are repeated until one of the conditions of steps 173 and 174 are satisfied.

It should be noted here that the scheduled heating time-temperature profile $T_s(t)$ over the scheduling time interval $[0, t_4]$ could be more aggressively defined in step 127 using the concepts just described. This would involve adjusting the scheduling flow diagram of FIG. 5 in a similar manner to the way in which the overall process flow diagram of FIG. 3 was adjusted to produce the more aggressive overall process flow diagram of FIG. 8. However, it may be more desirable to still use the scheduling flow diagram of FIG. 5 to obtain a conservative scheduled heating time-temperature profile so as to define the outer bounds of the heating phase.

3.b. Cooling Phase Performed in Precooker 102

Figure 9:
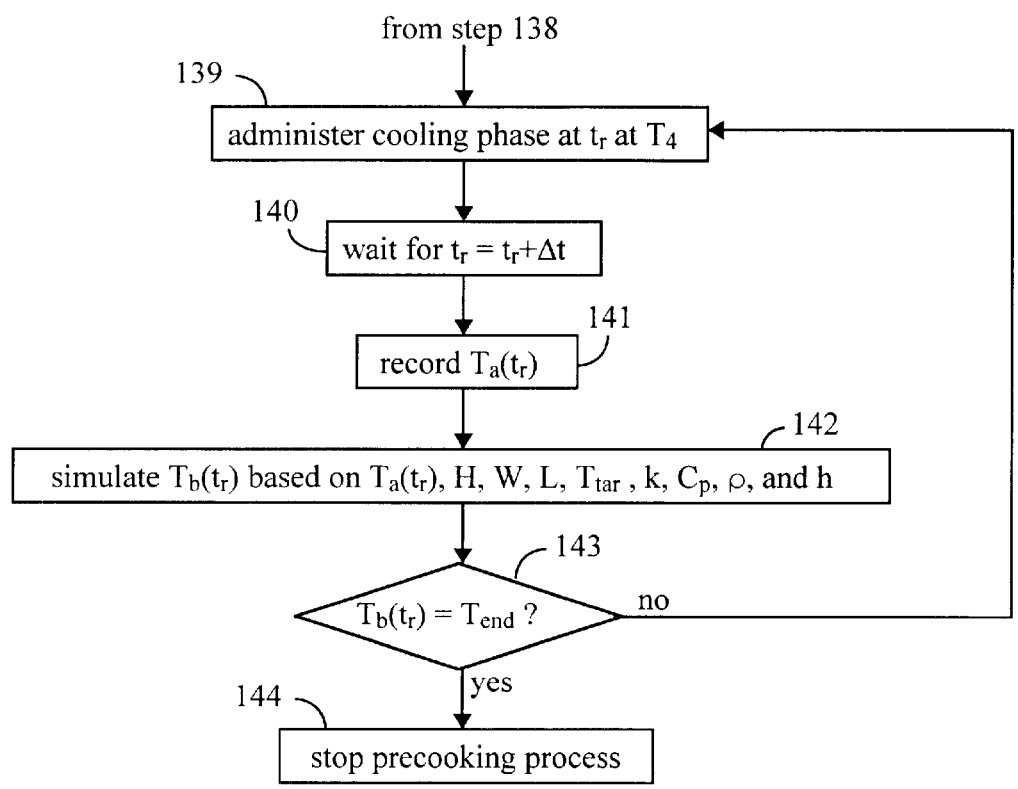
FIG. 9 shows a detailed process flow for a cooling phase to be optionally used with either of the overall process flow diagrams of FIG. 3 or 8.

As mentioned earlier in section 2.a., the cooling phase is performed external to the precooker of FIG. 1 in the exemplary embodiment. In another embodiment, where plant capacity is not as much of an issue, the precooker in fact may perform the cooling phase. FIG. 9 shows an overall process flow diagram for controlling the cooling phase in this case and could be used with the overall process flow diagram of FIG. 3 or 8. But, step 126 would include defining a scheduled cooling temperature $T_4$ for the cooling phase and an end backbone loin temperature $T_{end}$ as input parameters.

Thus, when the processing subphase is ended in step 138 of the overall process flow diagram of FIG. 3 or 8, the control program 109 of FIG. 2 proceeds to step 139. In step 139, the control program causes the cooling phase to be administered by the control circuitry 117 of FIG. 2 at each real time epoch $t_r$ of the cooling phase. Here, the control circuitry does so in accordance with the scheduled cooling temperature $T_4$ by appropriately controlling the precooker 102 of FIG. 1. In this case, the actual time-temperature profile $T_a(t)$ for the precooking process is attempted to be maintained constant at the scheduled cooling temperature. In doing so, the control circuitry controls the precooker and monitors the sensed actual temperature $T_a(t_r)$ at each real time epoch $t_r$ of the cooling phase to make sure that this temperature stays at least equal to the scheduled cooling temperature $T_4$.

Similar to steps 129 and 134 of FIGS. 3 and 8, the control program 109 of FIG. 2 then waits for the next real time epoch $t_r=t_r+\Delta t_r$ in step 140. In step 141, which is similar to steps 130 and 135 of FIGS. 3 and 8, the control program records the actual temperature $T_a(t_r)$ at this epoch sensed in the precooker 102 of FIG. 1. Thus, the control program also compiles a cooling portion of the actual time-temperature profile $T_a(t)$ over a cooling time interval $(t_4, t_5]$ by doing this at each real time epoch $t_r$ of the cooling phase.

The control program 109 of FIG. 2 once again invokes the simulation program 111 of FIG. 2 for step 142. Similar to steps 131 and 136 of FIGS. 3 and 8, the simulation program simulates at each real time epoch $t_r$ of the processing subphase the backbone loin temperature $T_b(t_r$ at that epoch in step 142. In this case, however, the actual temperature $T_a(t_r)$ sensed at this epoch and recorded in step 141 is used. As with steps 131 and 136, the precise manner in which step 142 is performed is discussed in greater detail in section 2.c.

Similar to step 137, the control program 109 of FIG. 2 determines in step 143 whether the cooling phase has been completed. This is done by determining whether the simulated backbone loin temperature $T_b(t_r$ at the current real time epoch $t_r$ has reached the end backbone loin temperature $T_{end}$. If it has not, then the control program returns to step 139 and steps 139 to 143 are repeated until it is finally determined in step 143 that the cooling phase has been completed. The precooking process is then stopped in step 144. The epoch at which this occurs is then the actual end time $t_5$ of the cooling phase and, of course, is also the actual end time of the entire precooking process.

3.c. Decreasing Time-Temperature Steps Without On-Line Control

As discussed earlier in section 2.a., the use of the decreasing time-temperature steps in the scheduled time-temperature profile $T_s(t)$ provide a significant increase in yield, quality, and energy savings for the precooking process. Thus, in another embodiment of the invention, the precooking system 100 may perform a precooking process according to these decreasing time-temperature steps without on-line control of heat transfer in the manner discussed in section 2.a. and shown in FIG. 3. In other words, these decreasing time-temperature steps can be used without simulating the backbone loin temperature $T_b(t_r$ or $T_b(t_s)$ to determine if a target backbone loin temperature has been reached.

3.d. Other Kinds of Scheduled Heating Time-Temperature Profiles

As those skilled in the art will recognize, more or less time-temperature steps may be used in the scheduled heating time-temperature profile $T_s(t)$. Specifically, in the case of the tuna fish 101 of FIG. 1, the number of decreasing time-temperature steps may depend on the type, size, and source of the tuna fish. It also may depend on the type of precooker that precooker 102 of FIG. 2 is.

But, other types of scheduled heating time-temperature profiles can be used in conjunction with on-line control of heat transfer in a similar manner to that discussed earlier in sections 2.a. to 2.c. and shown in FIGS. 3 to 6. For example, the profile may have ramping up and/or down linear, exponential, square wave, and/or curvilinear portions. This is particularly true where, as discussed next in section 3.e., the invention is used for any food preparation process where heat transfer is involved.

3.e. Food Preparation Process

In the embodiments of FIGS. 1 to 7 and sections 1 to 2.c. and 3.a. to 3.c., a tuna fish precooking process was used to describe the invention in detail. However, in a more general embodiment, the invention can be used in any food preparation process in which heat transfer is used to prepare a food item for further processing or consumption. Such a food item may be a meat item, such as poultry, beef, pork, fish, shellfish, etc. Alternatively, it could be a vegetable or fruit item. In this more general embodiment, the tuna fish precooking system 100 is a food preparation system, the precooker 102 is a heating and/or cooling chamber, the tuna fish 101 is the food item, the simulated backbone loin temperature $T_b(t_r$ or $T_b(t_s)$ is a simulated internal temperature in the food item, and the target and end backbone loin temperatures $T_{tar}$ and $T_{end}$ are respectively target and end internal temperatures for the food item.

4. Conclusion

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for precisely performing a heat-transfer process on a food item, the method comprising the steps of:

transferring heat to or from the food item in a chamber during the heat-transfer process;

sensing actual temperatures in the chamber during the heat-transfer process;

adjusting the sensed actual temperature according to a model of the chamber; and controlling the heat transferring step based on the adjusted sensed actual temperatures and according to a scheduled time-temperature profile, the scheduled time-temperature profile comprising time-temperature steps.

2. The method of claim 1 wherein the time-temperature steps comprise decreasing time-temperature steps.

3. The method of claim 2 wherein the time-temperature steps comprise only three decreasing time-temperature steps over a phase of the heat-transfer process.

4. The method of claim 3 wherein the food item comprises a tuna fish, the heat-transfer process comprises a tuna fish precooking process, the phase comprises a heating phase, and the simulated internal temperature at each real time epoch is for the backbone of the tuna fish.

5. A controller for controlling a food-preparation system, the controller comprising:

programmable control circuitry;

the computer-readable memory of claim 1 communicatively coupled to the programmable control circuitry.

6. The controller of claim 5 wherein the time-temperature steps comprise decreasing time-temperature steps.

7. The controller of claim 6 wherein
the time-temperature steps comprise only three decreasing time-temperature steps over a phase of the heat-transfer process.

8. The controller of claim 7 wherein
the food item comprises a tuna fish,
the heat-transfer process comprises a tuna fish precooking process,
the phase comprises a heating phase, and
the simulated internal temperature at each real time epoch is for the backbone of the tuna fish.

9. A food preparation system for performing a heat-transfer process on a food item, the food preparation system comprising:
a chamber configured to transfer heat to or from the food item;
a sensor configured to sense actual temperatures in the chamber during the heat-transfer process; and
the controller of claim 5.

10. The food preparation system of claim 9 wherein the time-temperature steps comprise decreasing time-temperature steps.

11. The food preparation system of claim 10 wherein
the time-temperature steps comprise only three decreasing time-temperature steps over a phase of the heat-transfer process.

12. The food preparation system of claim 11 wherein
the food item comprises a tuna fish,
the heat-transfer process comprises a tuna fish precooking process,
the phase comprises a heating phase, and
the simulated internal temperature at each real time epoch is for the backbone of the tuna fish.

13. A computer-readable memory for causing a controller to perform a heat-transfer process on a food item by
transferring heat to or from the food item in a chamber during the heat-transfer process;
sensing actual temperatures in the chamber during the heat-transfer process;
adjusting the sensed actual temperature according to a model of the chamber; and
controlling the heat transferring step based on the adjusted sensed actual temperatures and according to a scheduled time-temperature profile, the scheduled time-temperature profile comprising time-temperature steps.

14. The computer readable memory of claim 13 wherein
the time-temperature steps comprise decreasing time-temperature steps.

15. The computer readable memory of claim 14 wherein
the time-temperature steps comprise only three decreasing time-temperature steps over a phase of the heat-transfer process.

16. The computer readable memory of claim 15 wherein
the food item comprises a tuna fish,
the heat-transfer process comprises a tuna fish precooking process,
the phase comprises a heating phase, and
the simulated internal temperature at each real time epoch is for the backbone of the tuna fish.

\* \* \* \* \*

UNITED STATES PATENT AND TRADEMARK OFFICE
CERTIFICATE OF CORRECTION

PATENT NO. : 6,518,550 B1
APPLICATION NO. : 09/632150
DATED : February 11, 2003
INVENTOR(S) : Z. Weng It is certified that error appears in the above-identified patent and that said Letters Patent is hereby corrected as shown below:

| COLUMN | LINE | ERROR |
|---|---|---|
| (56) Pg. 2, col. 1 | Refs. Cited (Other Publs., Item 8) | "Testing on" should read --Testing of-- |
| 4 | 65 | "tend" should read --$t_{end}$-- |
| 5 | 5 | "tend" should read --$t_{end}$-- |
| 5 | 11 | "H. W." should read --H, W,-- |
| 5 | 12 | "$T_3, _{t1},$" should read --$T_3, t_1,$-- |
| 5 | 29 | "$T_3, _{t1},$" should read --$T_3, t_1,$-- |
| 6 | 7 | "$t_r = +\Delta t_r$" should read --$t_r = t_r + \Delta t_r$-- |
| 6 | 53 | "$T_s(t) = T_1,$" should read --$T_s(t_r) = T_1,$-- |
| 6 | 57 | "$t_r = +\Delta t_r$" should read --$t_r = t_r + \Delta t_r$-- |
| 6 | 58 | "$T_a(t)$" should read --$T_a(t_r)$-- |
| 6 | 62 | "$T_a t)$" should read --$T_a(t)$-- |
| 7 | 1 | "$T_b(t_r$" should read --$T_b(t_r)$-- |
| 7 | 18 | "then stopped" should read --then stops-- |
| 7 | 22 | "performed insteps" should read --performed in steps-- |
| 7 | 41 | A new paragraph should begin after the sentence ending "time interval results." |
| 8 | 34 | "tend" should read --$t_{end}$-- |
| 10 | 59 | "$\Delta V_{ij}$ and temperature $T_{ij}(t_e)$" should read --$\Delta V_{i,j}$ and temperature $T_{i,j}(t_e)$-- |

UNITED STATES PATENT AND TRADEMARK OFFICE
CERTIFICATE OF CORRECTION

PATENT NO. : 6,518,550 B1  Page 2 of 4
APPLICATION NO. : 09/632150
DATED : February 11, 2003
INVENTOR(S) : Z. Weng It is certified that error appears in the above-identified patent and that said Letters Patent is hereby corrected as shown below:

| COLUMN | LINE | ERROR |
|---|---|---|
| 10 | 63-65 | "with the index I ranging from 1 to I and the index j ranging from 1 to j," should read --(I)(J)+1-- |
| 10 | 66 | "1 to j," should read --1 to J,-- |
| 11 | 2 | "from 1 to 18 and the index j ranges from 1 to 59" should read --from 1 to I=8 and the index j ranges from 1 to J=9-- |
| 11 | 5-6 | "$\Delta V_{ij}$ is defined to have two surface areas $A_{ij}^N$ and $A_{ij}^S$" should read --$\Delta V_{i,j}$ is defined to have two surface areas $A_{i,j}^N$ and $A_{i,j}^S$-- |
| 11 | 7 | "$A_{ij}^W$" should read --$A_{i,j}^W$-- |
| 11 | 8 | "$A_{ij}^E$" should read --$A_{i,j}^E$-- |
| 11 | 34 | "$T_{ij}(t_e)$" should read --$T_{i,j}(t_e)$-- |
| 11 | 34 | "$\Delta V_{ij}$" should read --$\Delta V_{i,j}$-- |
| 11 | 39-40 | "$T_{ij}(t_e-\Delta t), T_{i,j-1}(t_e-\Delta t),$" should read --$T_{i,j}(t_e-\Delta t), T_{i,j-1}(t_e-\Delta t),$-- |
| 11 | 39-40 | "$T_{ij+1}(t_e-\Delta t,),$" should read --$T_{i,j+1}(t_e-\Delta t),$-- |
| 11 | 41-42 | "$\Delta V_{ij}$ and the adjacent volume elements $\Delta V_{ij-1}$, $\Delta V_{ij+1}$, and $\Delta V_{i+ij}$" should read --$\Delta V_{i,j}$ and the adjacent volume elements $\Delta V_{i,j-1}$, $\Delta V_{i,j+1}$, and $\Delta V_{i+1,j}$-- |
| 11 | 43 | "$A_{ij}^W, A_{ij}^E$" should read --$A_{i,j}^W, A_{i,j}^E$-- |
| 11 | 44 | "$A_{ij}^S$." should read --$A_{i,j}^S$.-- |
| 11 | 57 | "$\Delta X_{ij}^W, \Delta X_{ij}^E$, and $\Delta Y_{ij}^S$" should read $\Delta x_{i,j}^W, \Delta x_{i,j}^E$, and $\Delta y_{i,j}^S$" |

UNITED STATES PATENT AND TRADEMARK OFFICE
CERTIFICATE OF CORRECTION

PATENT NO.        : 6,518,550 B1
APPLICATION NO.   : 09/632150
DATED             : February 11, 2003
INVENTOR(S)       : Z. Weng It is certified that error appears in the above-identified patent and that said Letters Patent is hereby corrected as shown below:

| COLUMN | LINE | ERROR |
|---|---|---|
| 11 | 66 | "$T_{ij\text{-}1}$" should read --$T_{i,j\text{-}1}$-- |
| 12 | 1 | "$\Delta V_{ij\text{-}1}$." should read --$\Delta V_{i,j\text{-}1}$.-- |
| 12 | 1 | "$T_{ij+1}(t_e)$" should read -- $T_{i,j+1}(t_e)$-- |
| 12 | 7 | "$\Delta V_{ij}$" should read --$\Delta V_{i,j}$-- |
| 12 | 8 | "$T_{i\text{-}1j}(t_e\text{-}\Delta t)$" should read --$T_{i\text{-}1,j}(t_e\text{-}\Delta t)$-- |
| 12 | 9 | "$\Delta V_{i\text{-}1j}$" should read --$\Delta V_{i\text{-}1,j}$-- |
| 12 | 10 | "$A_{ij}^N$" should read --$A_{i,j}^N$-- |
| 12 | 12 | "$\Delta V_{i\text{-}1j}$" should read --$\Delta V_{i\text{-}1,j}$-- |
| 12 | 28-29 | "$\Delta Y_{ij}^N$ is the distance between the node i,j and the adjacent node i-1, j" should read --$\Delta y_{i,j}^N$ is the distance between the node i,j and the adjacent node i-1,j-- |
| 12 | 31 | after "other interior" insert --volume-- |
| 12 | 35 | "$T_{ij\text{-}1}(t_e)$" should read --$T_{i,j\text{-}1}(t_e)$-- |
| 12 | 36 | "$\Delta V_{ij\text{-}1}$." should read --$\Delta V_{i,j\text{-}1}$.-- |
| 12 | 37 | "$T_{ij+1}(t_e)$" should read --$T_{i,j+1}(t_e)$-- |
| 12 | 37 | "surface" should read --interior-- |
| 13 | 2-3 | "$A_b^{N1}$ to $A_b^{N9}$." should read --$A_{i,j}^{N1}$ to $A_{i,j}^{N9}$.-- |
| 15 | 18 | "$T_b(t_r\text{at}$" should read --$T_b(t_r)$ at-- |
| 15 | 26 | "$T_b(t_r\text{at}$" should read --$T_b(t_r)$ at-- |

UNITED STATES PATENT AND TRADEMARK OFFICE
CERTIFICATE OF CORRECTION

PATENT NO. : 6,518,550 B1
APPLICATION NO. : 09/632150
DATED : February 11, 2003
INVENTOR(S) : Z. Weng It is certified that error appears in the above-identified patent and that said Letters Patent is hereby corrected as shown below:

| COLUMN | LINE | ERROR |
|---|---|---|
| 15 | 49 | "$T_b(t_r$or" should read --$T_b(t_r)$ or-- |
| 16 | 19 | "'$T_b(t_r$or" should read --$T_b(t_r)$ or-- |
| 16 (Claim 5, | 61-67 lines 1-7) | delete claim 5 in its entirety and insert --5. A controller for controlling a food-preparation system, the controller comprising: the computer-readable memory of claim 13; and programmable control circuitry, communicatively coupled to the computer-readable memory, for executing instructions stored therein.-- |
| 17 (Claim 9, | 21 line 8) | "the controller of claim 5." should read --the controller of claim 5 configured to control a heat-transfer process including transferring heat and sensing actual temperatures in the chamber.-- |

Signed and Sealed this

Twenty-first Day of April, 2009

JOHN DOLL
*Acting Director of the United States Patent and Trademark Office*